United States Patent
Dougherty

(10) Patent No.: US 6,684,657 B1
(45) Date of Patent: Feb. 3, 2004

(54) RETHERMALIZATION / REFRIGERATION FOOD DELIVERY SYSTEM

(75) Inventor: Carl J. Dougherty, Grand Prairie, TX (US)

(73) Assignee: Enersyst Development Center, L.L.C., Dallas, TX (US)

( * ) Notice: Subject to any disclaimer, the term of this patent is extended or adjusted under 35 U.S.C. 154(b) by 0 days.

(21) Appl. No.: 09/936,829

(22) PCT Filed: Mar. 17, 2000

(86) PCT No.: PCT/US00/07017

§ 371 (c)(1),
(2), (4) Date: Mar. 4, 2002

(87) PCT Pub. No.: WO00/54641

PCT Pub. Date: Sep. 21, 2000

Related U.S. Application Data

(60) Provisional application No. 60/124,948, filed on Mar. 18, 1999, provisional application No. 60/135,580, filed on May 24, 1999, and provisional application No. 60/146,675, filed on Aug. 2, 1999.

(51) Int. Cl.[7] ............................ F25D 15/00; A47B 77/08
(52) U.S. Cl. ........................... 62/237; 165/918; 312/236
(58) Field of Search ........................... 62/237, 337, 383, 62/408, 447, 457.1; 312/236, 286, 403, 410; 165/918

(56) References Cited

U.S. PATENT DOCUMENTS

| 3,952,794 A | * | 4/1976 | Spanoudis | |
| 4,361,014 A | | 11/1982 | Blain | 62/237 |
| 4,730,100 A | * | 3/1988 | Pingelton | |
| 5,655,595 A | | 8/1997 | Westbrooks, Jr. | 165/48.1 |
| 5,975,202 A | * | 11/1999 | Grandi | 165/918 |

FOREIGN PATENT DOCUMENTS

| EP | 0919174 A | * | 6/1999 |
| FR | 1390459 A | * | 6/1965 |
| FR | 2207677 A | | 6/1974 |
| FR | WO-9709575 A | * | 3/1997 |
| WO | WO 00/54641 A1 | | 9/2000 |

* cited by examiner

*Primary Examiner*—Chen Wen Jiang
(74) *Attorney, Agent, or Firm*—Sidley Austin Brown & Wood LLP

(57) ABSTRACT

A novel thermal treatment apparatus is provided that includes at least one thermal treatment section (212) having a plurality of individual thermal treatment sections. The apparatus further includes: (a) an air supply duct (356) with at least one supply port (258) associated with each said individual thermal treatment section through which temperature controlled air passes into each said individual thermal treatment section and (b) at least one air return port (357) for each individual thermal treatment section through which said temperature controlled air exits the individual thermal treatment sections. A barrier (312) is provided between each individual thermal treatment section, preferably in the form of a removable food tray.

15 Claims, 18 Drawing Sheets

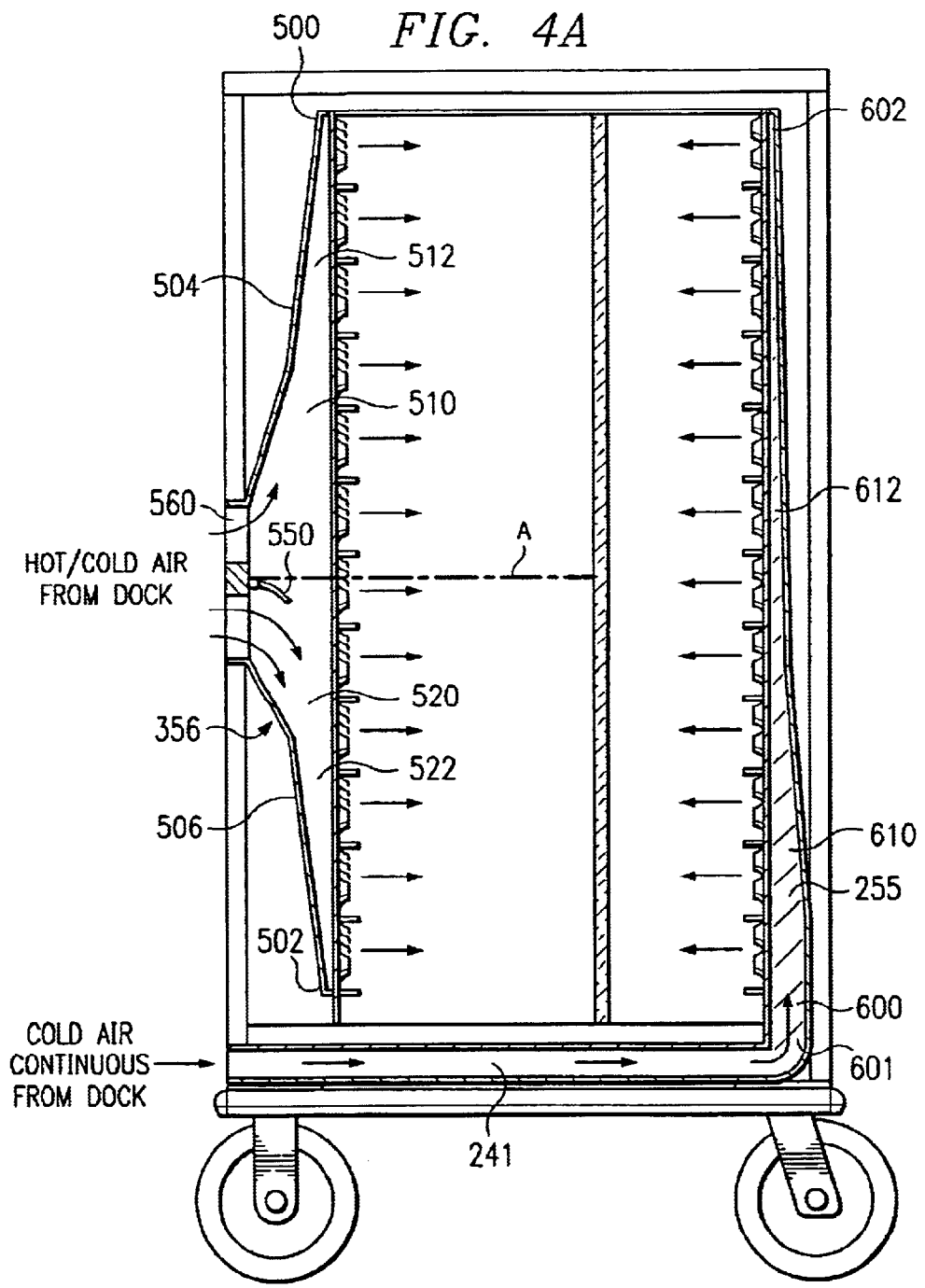

RETHERMALIZATION / REFRIGERATION FOOD DELIVERY SYSTEM

This application. is a 371 of PCT/US00/07017 filed Mar. 17, 2000 which claims benefit of Prov. No. 60/124,948 filed Mar. 18, 1999 and 60/135,580 filed May 24, 1999 and 60/146,675 filed Aug. 2, 1999.

The present invention relates generally to a thermal food treatment system which is capable of refrigerated storage and rethermalization of food. More particularly, the present invention relates to a novel rethermalization system comprising: (1) a food refrigeration/rethermalization cart; (2) a thermal barrier system; and (3) a docking station that provides refrigerated and heated air to the refrigeration/rethermalization cart.

BACKGROUND OF THE INVENTION

The preparation and service of large numbers of meals in an institutional setting has long posed a variety of problems. The ability to serve palatable meals with the various dishes being served at optimum temperature often conflicts with efforts to make service of the meals easier, more efficient and less manpower intensive.

The preparation, storage, rethermalization and service of a large number of meals have evolved through several stages. Initially, trays would be filled with food from various hot or cold storage container areas just prior to serving and transported to the individual serving areas (such as patients rooms in a hospital). However, as facilities grew larger, the assembly of trays from a centralized area became very difficult if not impossible. Frequently, in such systems the time between tray assembly and service grew longer, resulting in food being served at an unpalatable temperature or with spoilage occurring.

Early attempts to overcome such problems resulted in the development of storage carts having separate rethermalization and refrigeration storage compartments. These separate compartments would either be heated or cooled or would be well-insulated in order to maintain the food at a desired temperature. In use, food would be loaded into separate rethermalization and refrigeration storage compartments at a central food preparation area. The carts would then be transferred to various assembly locations. The individual meals could then be assembled on trays as desired and served. However, while such delivery systems did improve the time lag between assembly of the trays and service of the meal, they still required significant manpower at serving time because these trays had to be assembled. As a result, frequently food, which was intended to be warm when served would be heated for extended periods of time and would thus become unpalatable. In the alternative, if all trays were assembled at once, some of the heated food would cool by the time it was served and would also become unpalatable. Additionally, meal service times would be extended over the time required to assemble the trays. Furthermore, in prior art delivery carts having separated chilled and heated food storage compartments, the size and number of rethermalization and refrigeration storage compartments were fixed and could not easily be adjusted.

Another development was a food service system of trays and carts incorporating heating elements for rethermalization of refrigerated foods. The food was located on trays and kept in a refrigerated environment until the rethermalization cycle was initiated. In this type of system, trays could be pre-assembled whenever desired and loaded into the carts. In the refrigerated environment food would remain cold. At a desired time, heating elements would be activated, perhaps through computer programming, to rethermalize the food and to maintain the warm food in a warm condition while not effecting the temperature of food in the chilled compartments. After the food had reached a serving temperature the carts could then be rolled to the service locations and the trays served. However, such prior art systems required heating elements selectively place in the cart or in the tray in the areas corresponding to the food that would be heated. This need for specific placement of the heating element in the cart and/or tray increased the manufacturing and maintenance costs of the cart and/or tray.

U.S. Pat. No. 5,655,595 to Westbrooks, Jr., assigned on its face to Standex International Corporation, discloses a tray system for an integrated rethermalization/refrigeration cart (hereinafter "the Westbrooks tray system"). The Westbrooks tray system includes a tray (hereinafter "the Westbrooks tray") having a first section for storing cold food and a second section for storing hot food. In the Westbrooks tray system, the Westbrooks tray has a flat ridge that is inserted into a gap created between two dividers affixed to the cart. The gap between the two dividers is a fixed distance and the tray ridge must be configured to fill the gap in order to provide the necessary thermal barrier between the heated and refrigerated sections. The Westbrooks tray system is unforgiving with respect to the mating of the tray with gap. If the tray is too thin in comparison to the width of the gap, an adequate thermal barrier will not form. If the tray is not thin enough, the food service worker must exert extra care and effort to position the tray within the gap, if insertion is even possible. Furthermore, the Westbrooks tray system requires that a tray be inserted between each pair of dividers in order to maintain the necessary thermal barrier between the refrigerated section and the rethermalization section. Since every gap requires tray insertion, the Westbrooks tray system fails to provide flexibility with respect to the number and vertical size of heated and refrigerated storage sections provided.

The Westbrooks patent also describes a rethermalization system that includes a docking unit. The Westbrooks rethermalization system has one supply conduit to the food cart rethermalization compartment. This single supply conduit is used to first provide refrigerated air to the rethermalization compartment during the refrigeration cycle and then to provide heated air during the rethermalization cycle.

There is a need for a rethermalization system which can (1) handle adjacent rethermalization and refrigeration compartments within a single delivery cart, (2) a thermal barrier between such rethermalization and refrigeration compartments which is adjustable in both quantity and size, and (3) a cost-effective design for carrying out the dual refrigeration and rethermalization function without having to provide individual heating and refrigeration elements to each separate compartment within the delivery cart.

SUMMARY OF THE INVENTION

The present invention provides a novel thermal food treatment system that provides a novel air flow system from a docking unit through a delivery cart having a refrigeration section and a rethermalization section.

In one aspect of the invention, a thermal treatment apparatus is provided that includes a thermal treatment section having a plurality of individual thermal treatment sections. The apparatus further includes. (a) an air supply duct with at least one supply port associated with each said individual thermal treatment section through which temperature controlled air passes into each said individual thermal treatment section and (b) at least one air return port for each individual thermal treatment section through which said temperature controlled air exits the individual thermal treatment sections. In a preferred embodiment of the above-described invention, a barrier is provided between each individual thermal treatment section, preferably in the form of a removable food tray.

In another preferred embodiment of the invention, the thermal treatment apparatus includes a second thermal treatment section also having a plurality of individual thermal treatment sections and further includes (a) a second air supply duct with at least one supply port associated with each of the individual thermal treatment section of the second thermal treatment section through which temperature controlled air passes into each said individual thermal treatment section, and (b) at least one air return port for each individual thermal treatment section of the second thermal treatment section through which temperature controlled air exits.

In yet another preferred aspect of the invention, the thermal treatment apparatus the air supply duct has a novel design including an upper end, a lower end and an inlet opening between said upper and lower ends in fluid communication with a blower. The air supply duct has a plurality of air supply ports through which air may exit the duct into the thermal treatment section. The duct comprises (a) a first tapered upper portion adjacent the inlet opening and a second tapered upper portion adjacent the upper end, with the first tapered upper portion having a greater angle of taper than the second tapered upper portion, and (b) a first tapered lower portion adjacent the inlet opening and a second tapered lower portion adjacent the lower end, with the first tapered lower portion having a greater angle of taper than the second tapered lower portion. In another preferred embodiment of the invention an adjustable diverter is provided adjacent the inlet opening to control the amount of air supplied to the upper and lower ends of the air supply duct.

The present invention also provides a novel air flow system that during a first or refrigeration cycle provides refrigerated air to both the refrigeration section and the rethermalization section, but then during a second or rethermalization cycle provides refrigerated air to the refrigerated section while providing heated air to the rethermalization section.

The present invention also provides a novel thermal barrier system between the refrigeration and rethermalization compartments of the food delivery cart. That is, the novel cart according to the present invention that has a rethermalization storage compartment adjacent to a refrigerated storage compartment which has a removable self-adjusting sealing mechanism between the two storage compartments so as to provide a thermal barrier between the adjacent rethermalization and refrigerated storage compartments. This unique food delivery cart also include rethermalization and refrigerated storage compartments that are adjustable in both vertical height and number of compartments per cart.

BRIEF DESCRIPTION OF THE DRAWINGS

FIG. 4a is a cross-sectional view of the delivery cart from the opposite side shown in FIG. 4;

DETAILED DESCRIPTION OF THE PREFERRED EMBODIMENT

The present invention is a novel rethermalization system that includes a novel air flow transfer system between a docking unit and a delivery cart when mated or in a "docked" position. (The terms "mated" and "docked" are used interchangeably within.) The delivery cart of the present invention preferably has at least one refrigerated section (chamber) and one rethermalization section (chamber). The rethermalization system has a first cycle and a second cycle when mated. During the first or refrigeration cycle, refrigerated air is supplied via a cold air flow system to both the refrigerated and rethermalization sections of the delivery cart. During the second or rethermalization cycle, the cold air flow system supplies refrigerated air only to the refrigerated section of the cart, while heated air is supplied, via a separate heated air flow system, only to the rethermalization section of the delivery cart.

Figure 1:
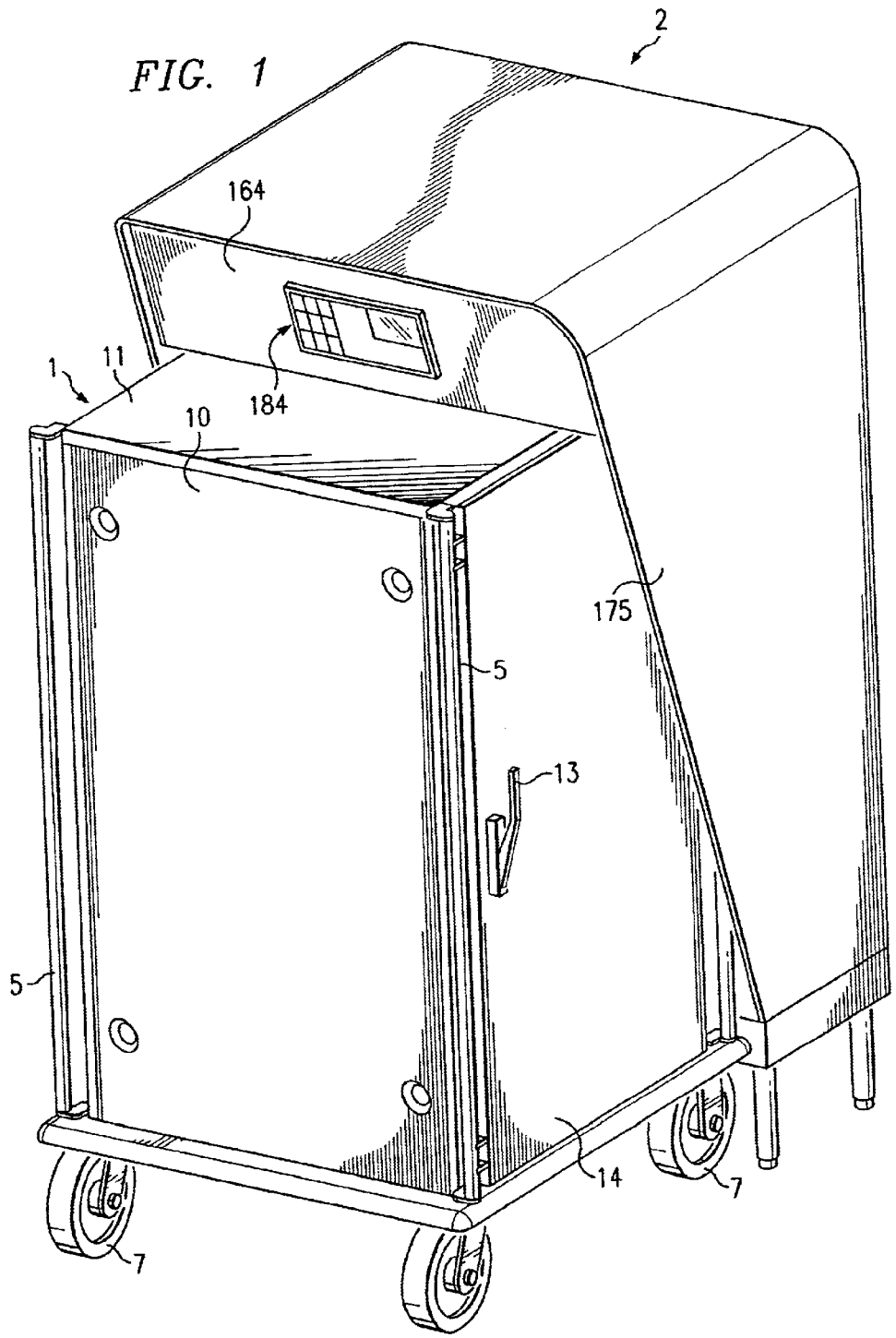
FIG. 1 is front right-side perspective view of the rethermalization/refrigeration system according to the present invention wherein a delivery cart is docked within the docking station.

FIG. 1 illustrates the preferred embodiment of the delivery cart of the present invention, generally 1, mated with a preferred embodiment of the docking unit of the present invention, generally 2. The delivery cart has wheels 7. The delivery cart has at least one access door 14. Preferably, the door has an access handle 13. The delivery cart has a non-docking exterior panel 10 and an exterior top panel 11. The delivery cart is mounted on three or more wheels 7, and, most preferably, four wheels. Preferably, the delivery cart has steering handles 5 at each of the four external corners. Preferably, the non-docking exterior side panel of the delivery cart is removable for cleaning the delivery cart. The docking unit has an upper docking unit extension 164 that extends over the delivery cart while in the docked position. The upper docking unit extension preferably has contained therein a controller 184, an evaporator (not shown) and compressor/condenser (not shown). The controller preferably can be programmed to initiate the first and second cycles. The controller also preferably has sensors that monitor the temperature of the air supply during each cycle. The controller also preferably has the capacity to be preprogrammed for six meals per day for a course of seven days. The controller preferably also has a cart presence sensor so that the rethermalization system will not operate unless a delivery cart is positioned/mated properly with the docking unit. The controller preferably also has the capacity to adjust the temperature achieved in the rethermalization section of the cart during the rethermalization cycle. The controller preferably also has the capacity to adjust the length of the cycle. The docking unit also preferably has side panel extensions 175.

Figure 2:
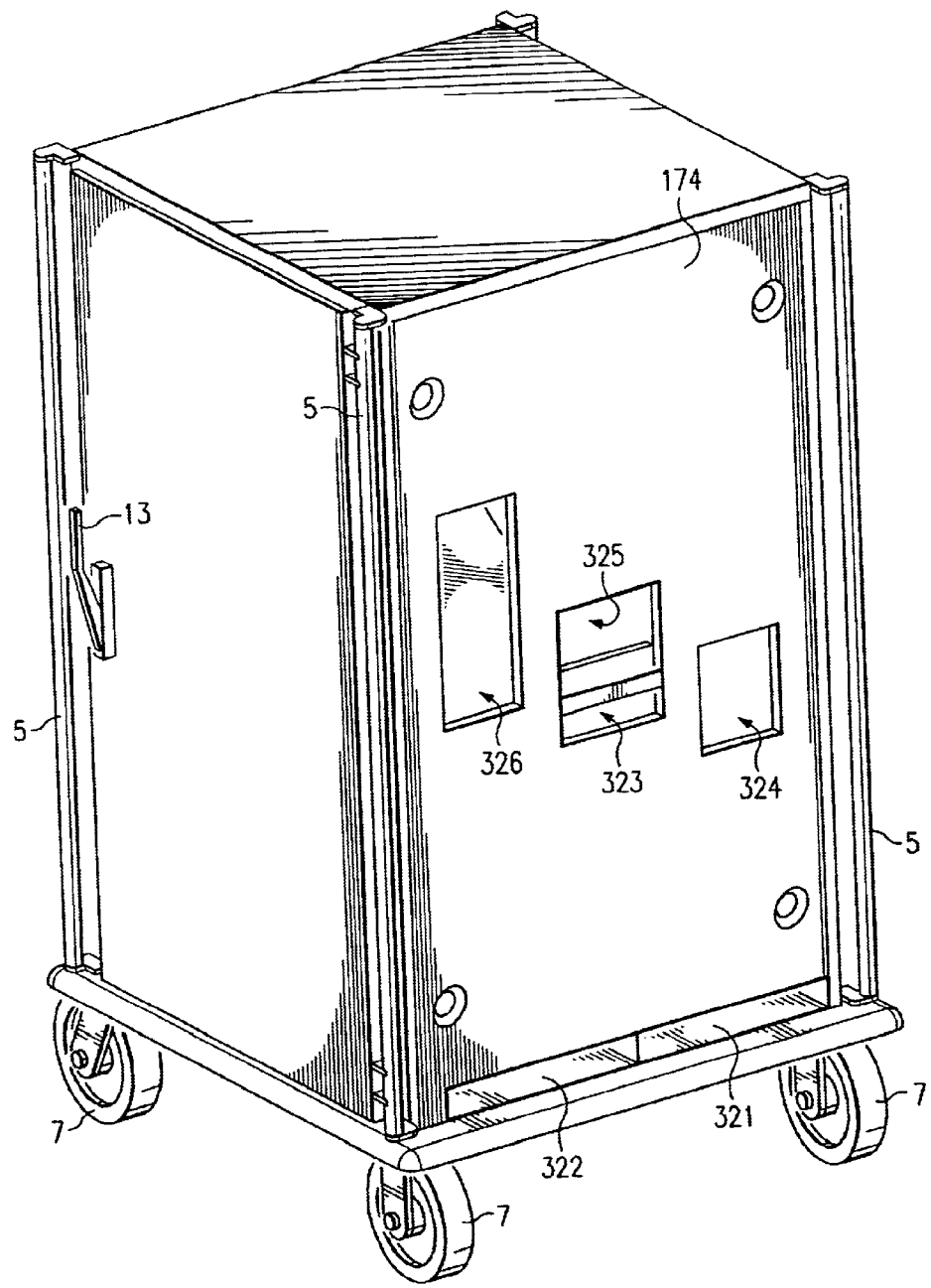
FIG. 2 is a front left-side perspective view of the delivery cart of the present invention illustrating the docking panel of the cart.

Referring to FIG. 2, the delivery cart has an external docking panel 174 that mates with the docking station. The external docking panel has apertures that correspond to apertures in the docking unit to allow air flow from the docking unit into the delivery cart and from the delivery cart back into the docking unit. The external docking panel has a first cart refrigerated air supply aperture 322, a first cart refrigerated air return aperture 321, a second cart refrigerated air supply aperture 323, a second cart air return aperture 324, a cart heated air supply aperture 325 and a cart heated air return aperture 326. Preferably, each aperture 321, 322, 323, 324, 325 and 326 has a gasket or seal (not shown). The external docking panel is preferably removable for cleaning of the delivery cart.

Figure 3:
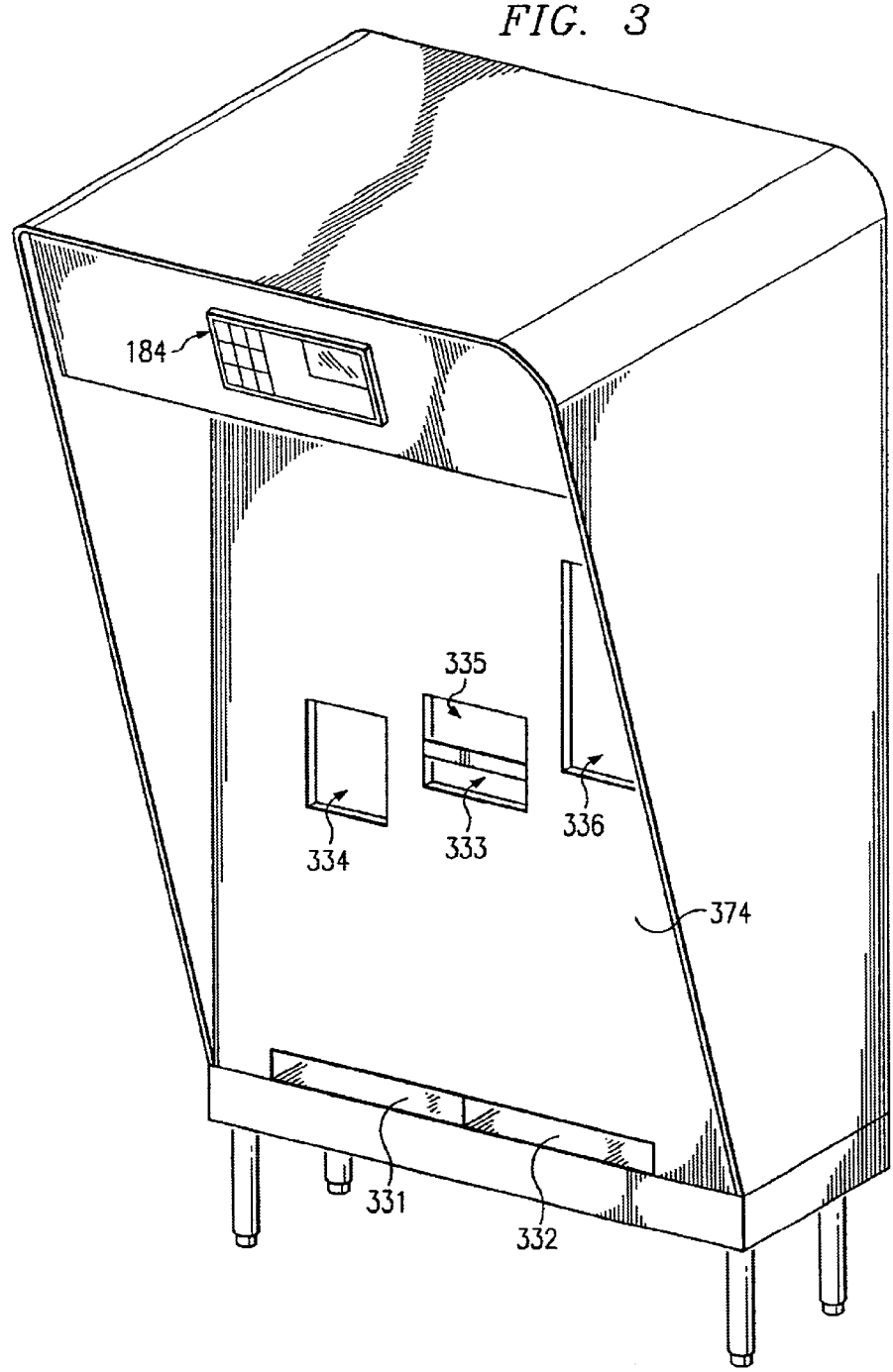
FIG. 3 is a front right-side perspective view of the docking station of the present invention illustrating the mating panel of the docking station.

FIG. 3 shows the mating panel 374 of the preferred embodiment of the docking unit. The docking unit has a first docking unit refrigerated air supply aperture 332, a first cart docking unit air return aperture 331, a second docking unit refrigerated air supply aperture 333, a second docking unit refrigerated air return aperture 334, a docking unit heated air supply aperture 335 and a docking unit heated air return aperture 336. As discussed above, each docking unit aperture mates with the corresponding delivery cart aperture to allow air flow between the delivery cart and the docking unit. For example, the first docking unit refrigerated air supply aperture 332 mates with the first cart refrigerated air supply aperture 322 to provide a mated first refrigerated air supply aperture. Preferably, the first refrigerated air supply apertures, 322 and 332, and return apertures, 321 and 331, are located in the lower portion of the delivery cart and docking unit, respectively. For reasons that will be explained below, it is most preferred that the second refrigerated air supply apertures of the delivery cart and docking unit, 323 and 333, are proximate in location to the heated air supply apertures of the delivery cart and docking unit, 325 and 335.

Figure 4:
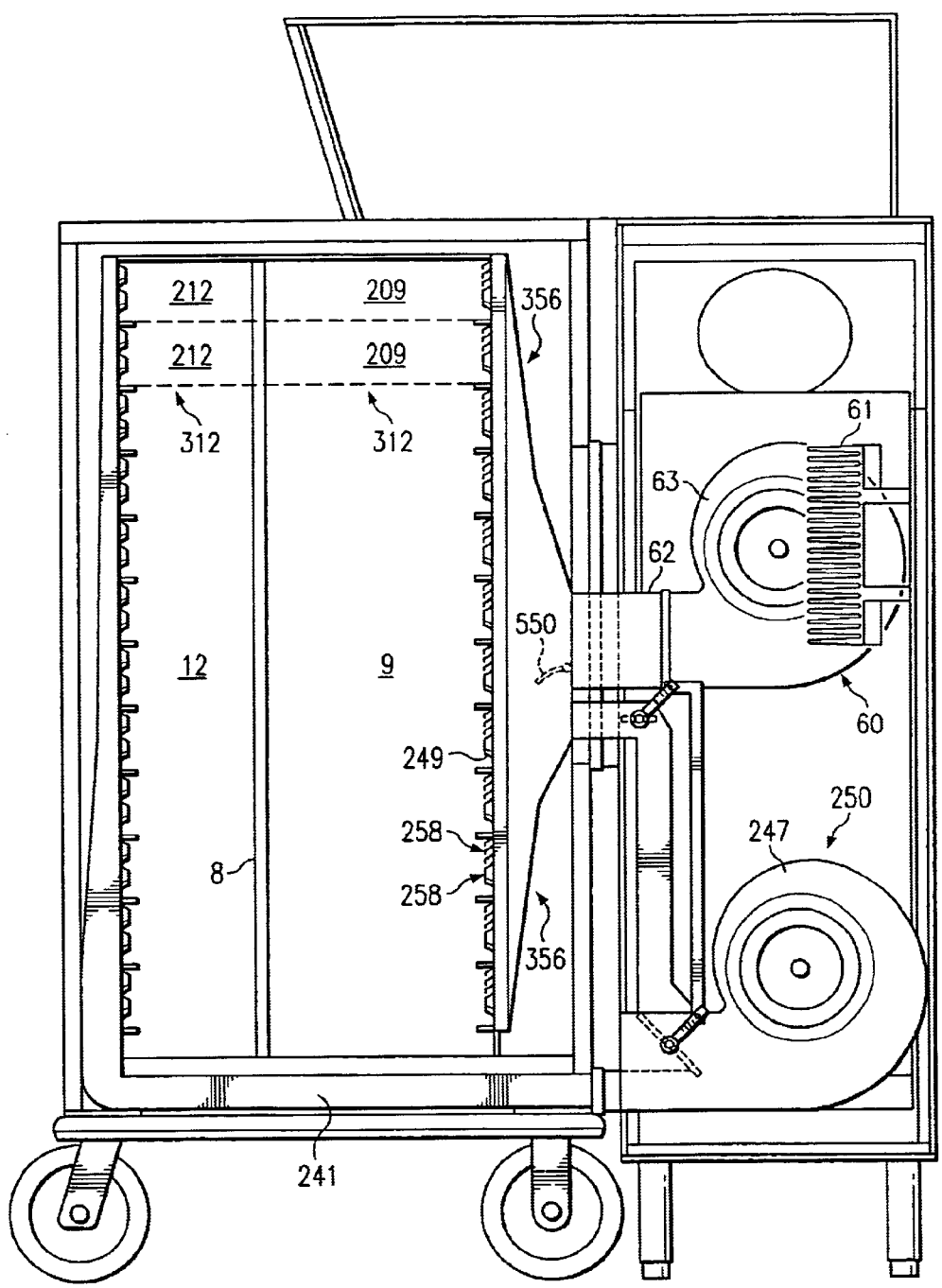
FIG. 4 is a cross-sectional view of the delivery cart mated to the docking station according to the present invention illustrating the transverse refrigerated air return duct from the delivery cart to the refrigeration source in the docking station and the heated air source supply duct from the docking station to the delivery cart.
Figure 6:
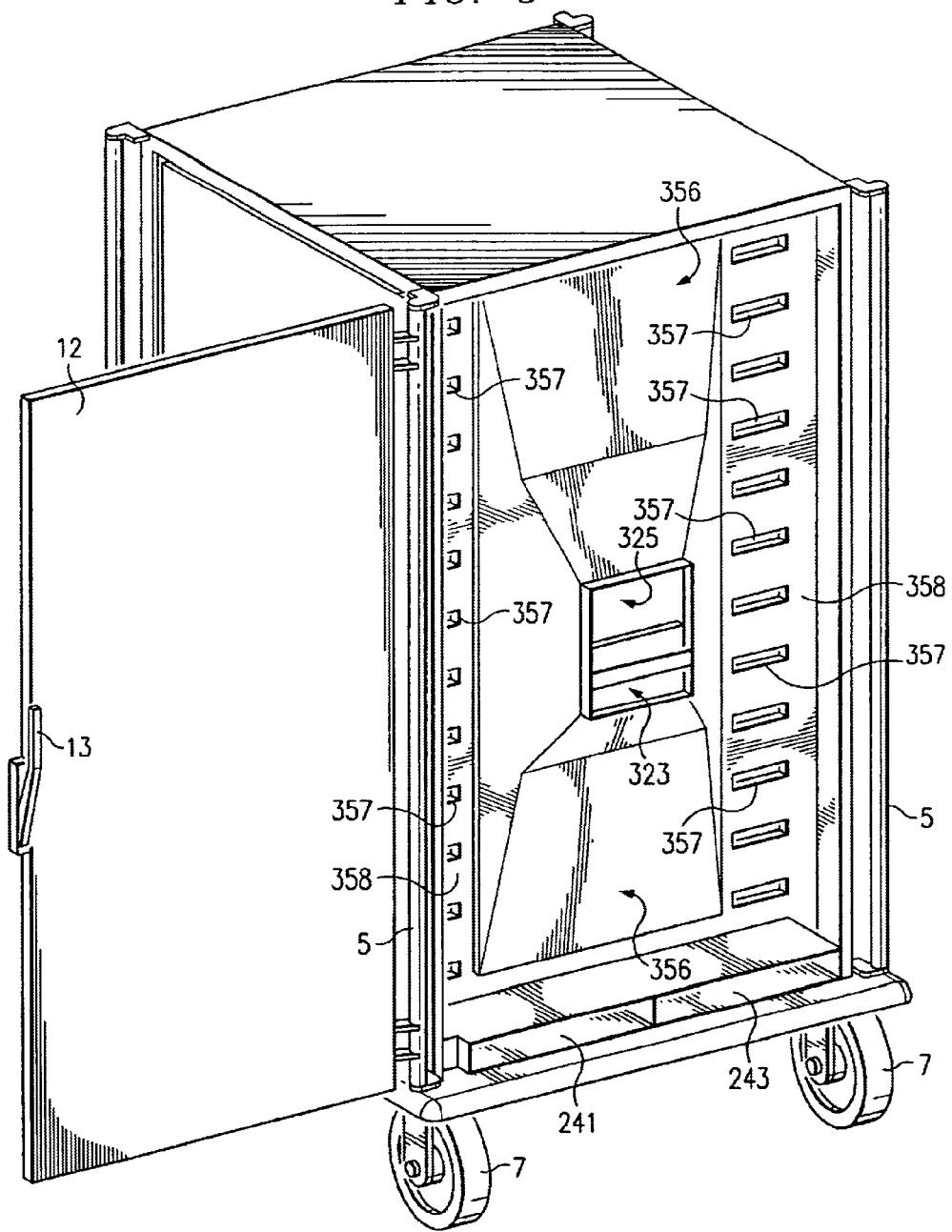
FIG. 6 is a front left-side perspective view of the delivery cart of FIG. 2 with the docking panel cover removed exposing the rethermalization chamber return air ducts.
Figure 7:
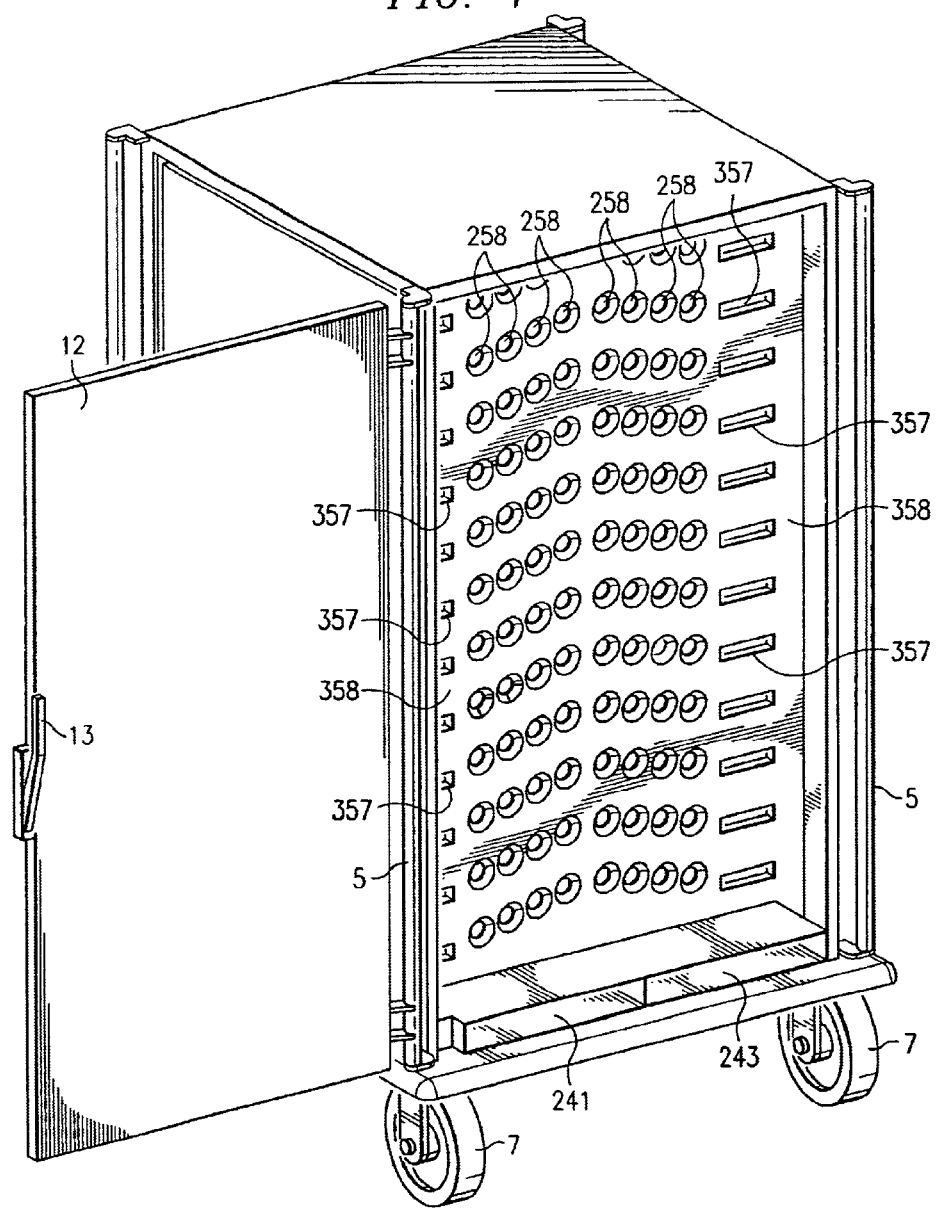
FIG. 7 is a perspective view of the delivery cart of FIG. 6 with the vertical rethermalization section air supply duct cover removed to expose the rethermalization air supply ports.
Figure 8:
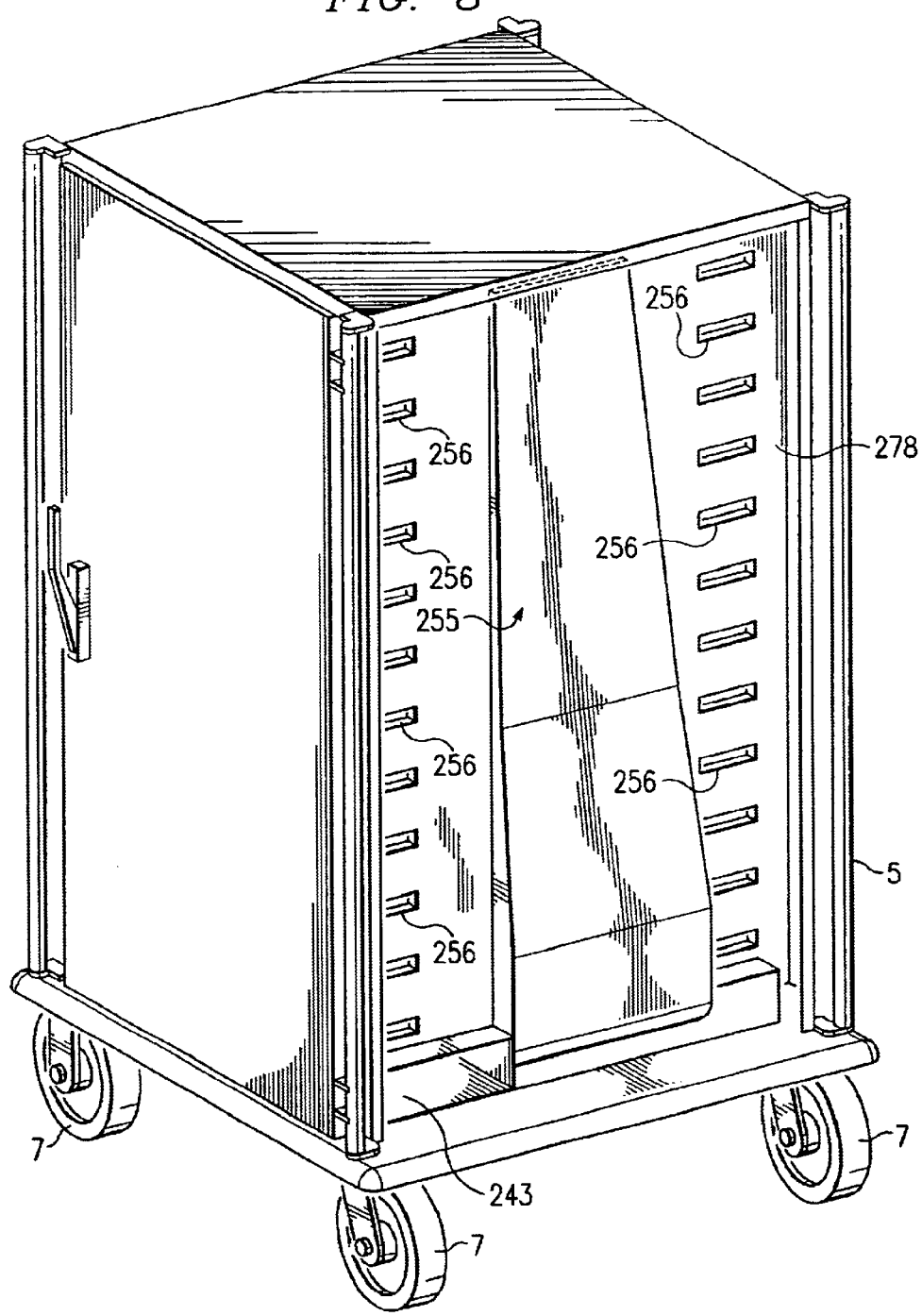
FIG. 8 is a rear left-side perspective view of the delivery cart of FIG. 2 with the rear panel cover removed exposing the refrigeration chamber return air ducts.
Figure 9:
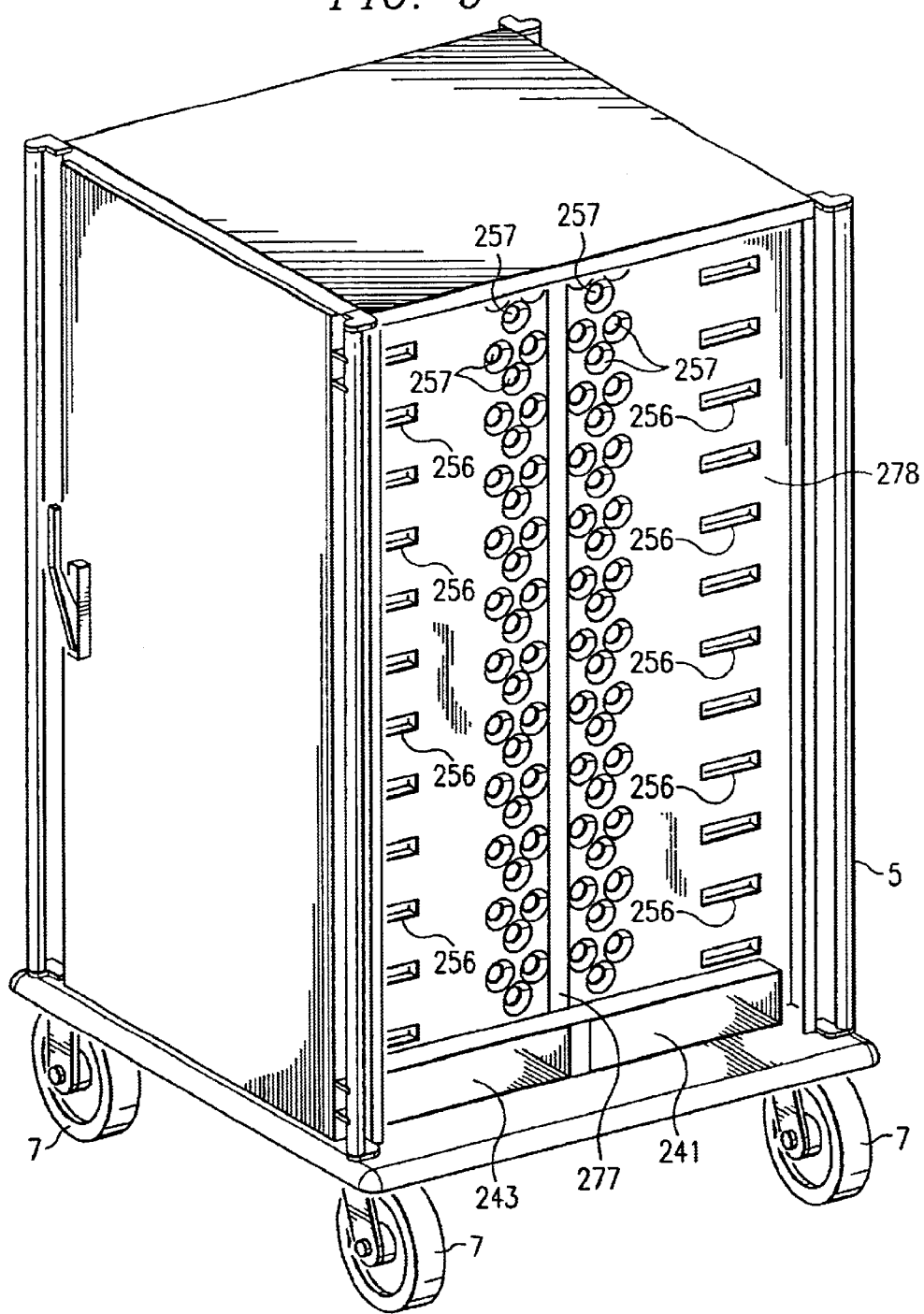
FIG. 9 is a perspective view of the delivery cart of FIG. 8 with the vertical refrigerated air supply duct cover removed to expose the refrigeration air supply ports.
Figure 10:
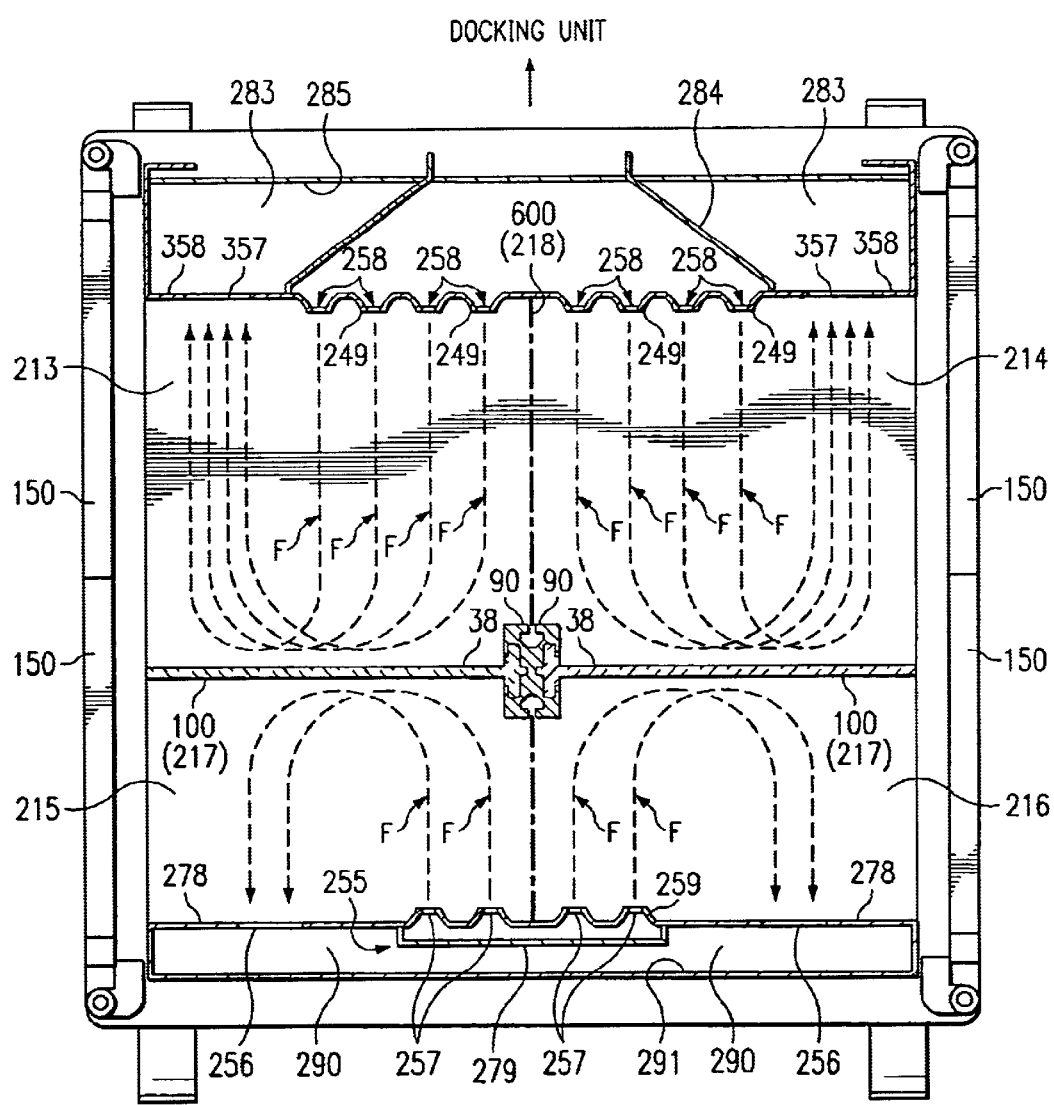
FIG. 10 is a top plan view of the delivery cart of the present invention illustrating the general air flow pattern in a preferred embodiment of the delivery cart having two rethermalization sections and two refrigeration sections.

FIG. 4 is a cross-section of the delivery cart while coupled to the docking unit. The docking unit has a heated air source 60 that has heaters 61 and a blower/fan (FIG. 4, ref. 63) that provides heated air to heat the rethermalization section (or chamber) during the second cycle. A docking unit heated air lead duct 62 transfers heated air from the heated air source to the mated heated air supply aperture. The docking unit also has a refrigerated air source 250 that also has a blower/fan (FIG. 4, ref. 247). The delivery cart has a transverse refrigerated air return duct 241. The transfer of refrigerated air from the refrigerated air source to and from the delivery cart will be discussed in detail further below. The food service cart has a vertical thermal barrier 8 that separates the interior of the delivery cart to provide a rethermalization section (chamber), generally 9, and a refrigerated section (chamber), generally 12. Both rethermalization and refrigerated sections are further divided by horizontal barriers 312 to provide a plurality of individual rethermalization sections 209 and a plurality of individual refrigerated sections 212. The rethermalization section 9 has a plurality of rethermalization section supply ports 258 and rethermalization section return ports (FIGS. 6–7, ref. 357). The refrigerated section 12 has a plurality of refrigerated air supply ports (FIGS. 8–10, ref. 257) and a plurality of refrigerated air return ports (FIGS. 8–10, ref. 256). For reasons that will be evident from the discussion below, each individual rethermalization section 209 must have at least one rethermalization section supply port and at least one rethermalization section return port. Additionally, each individual refrigeration 212 section must have at least one refrigerated air supply port and at least one refrigerated air return port.

Figure 4B:
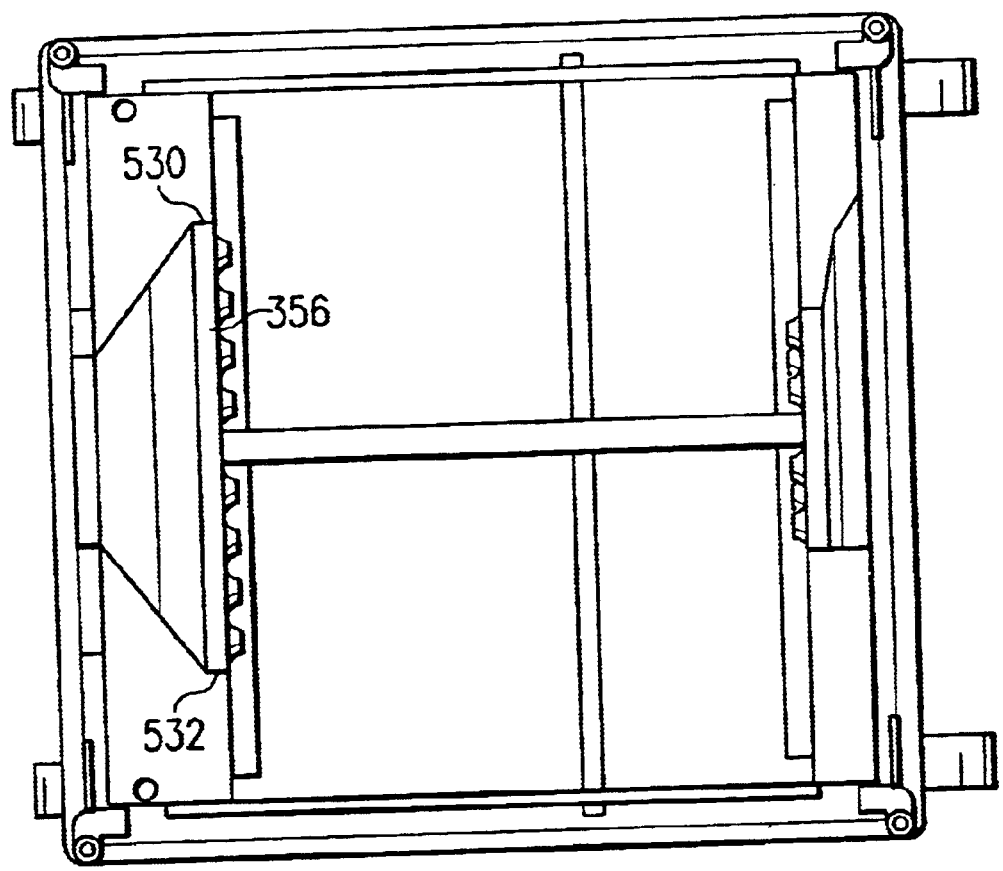
FIG. 4b is a cross-sectional top view of the delivery cart depicted in FIG. 4.

As shown in FIGS. 4 and 4a, a vertical rethermalization supply duct 356 is provided. Horizontal axis A is shown extending through the approximate center of the duct 356 between upper end 500 and lower end 502. As shown the duct 356 has a dual taper configuration in both the upper section 504 and lower section 506. More particularly, the upper section 504 of duct 356 has a first tapered portion 510 adjacent axis A and a second tapered portion 512 adjacent the upper end 500. Likewise, the lower section 506 of duct 356 has a first tapered portion 520 adjacent axis A and a second tapered portion 522 adjacent lower end 502. As shown, the first tapered portion 510 of the upper section 504 has a greater angle of taper than the corresponding second tapered portion 512 which has a lower slope, and, similarly, the first tapered portion 520 of the lower section 506 has a greater angle of taper than the corresponding second tapered portion 522 of the lower section 506. In both the upper section 504 and lower section 506, the first tapered portions 510 and 512 extend approximately one-quarter to one-half of the length from the axis A to the respective upper and lower ends (500, 502) of the duct 356. The degree of taper in the first and second tapered portions may vary. Preferably, the first tapered portions taper down 1 inch for every 1 to 3 inches of length and the second tapered portions taper 1 inch for every 7 to 16 inches of length. As shown, in FIG. 4b (top view), the vertical rethermalization supply duct 356 also tapers laterally toward duct ends 530 and 532. The above-described duct configuration has been found to provide improved evenness of air flow along the entire length of the duct, thus providing even heat transfer from the top to the bottom of the rethermalization section of the cart.

As shown in FIG. 4a, a vertical refrigeration supply duct 255 (denoted by cross hatching) is provided and has a dual taper configuration to provide even air flow from the duct along its length. More particularly, duct 255 has a first tapered portion 610 adjacent lower end 600 and inlet opening 601 and a second tapered portion 612 adjacent the upper end 602. As shown, the first tapered portion 610 has a greater angle of taper than the second tapered portion 612 which has a lower slope. Preferably, the first tapered portion 610 extends approximately one-quarter to one-half of the length of the duct. The degree of taper in the first and second tapered portions may vary. Preferably, the first tapered portion tapers down 1 inch for every 1 to 3 inches of length and the second tapered portion tapers 1 inch for every 7 to 16 inches of length.

Still referring to FIG. 4a, an adjustable diverter 550 also may be disposed in or about the vertical rethermalization supply duct 356 near its inlet opening 560. The diverter positioned to allow the operator to adjust and control the amount of air flow to the upper and lower sections (504, 506) of the vertical rethermalization supply duct 356. The diverter has been found to be particularly useful when it is expected that the cart will be separated from the docking unit for extended periods of time (e.g., an hour). When a cart is undocked for a period of time, rethermalized food products on the lower shelves tend cool more rapidly than food products on the upper shelves due to the natural heating effects (i.e., heated air rises). By diverting more heated air to the lower section 506 of the vertical rethermalization supply duct 356, heat transfer to the food products on the lower shelves is greater than heat transfer to food products on the higher shelves (while rethermalization air temperature remains constant), thus counteracting the greater loss of heat that naturally occurs on the lower shelves of the undocked cart.

The diverter 550 also permits the fine tuning of the system by allowing the amount of heated air entering the upper and lower sections of the cart to be controlled and adjusted. For example, carts with twenty four shelves are common in the industry. Twenty-shelf carts are also common and are essentially twenty four-shelf carts with the top four shelves eliminated. With a diverter adjusted to provide more heated air to the lower section of the cart, a twenty-shelf cart can be docked to the same docking unit as a twenty four-shelf cart and food can be evenly rethermalized from top to bottom.

Although the delivery cart only requires one refrigerated section and one rethermalization section, in the preferred embodiment the delivery cart has two refrigerated sections and two rethermalization sections. When the delivery cart has two refrigerated sections and two rethermalization sections, the rethermalization sections located in the delivery cart so that both rethermalization sections are proximate the docking unit when in the docked position. Conversely, both refrigerated sections are distal the docking unit when in the docked position. The orientation of the rethermalization sections and refrigeration sections will discussed again further below and, in particular, with respect to the discussion of FIG. 10.

Figure 5A:
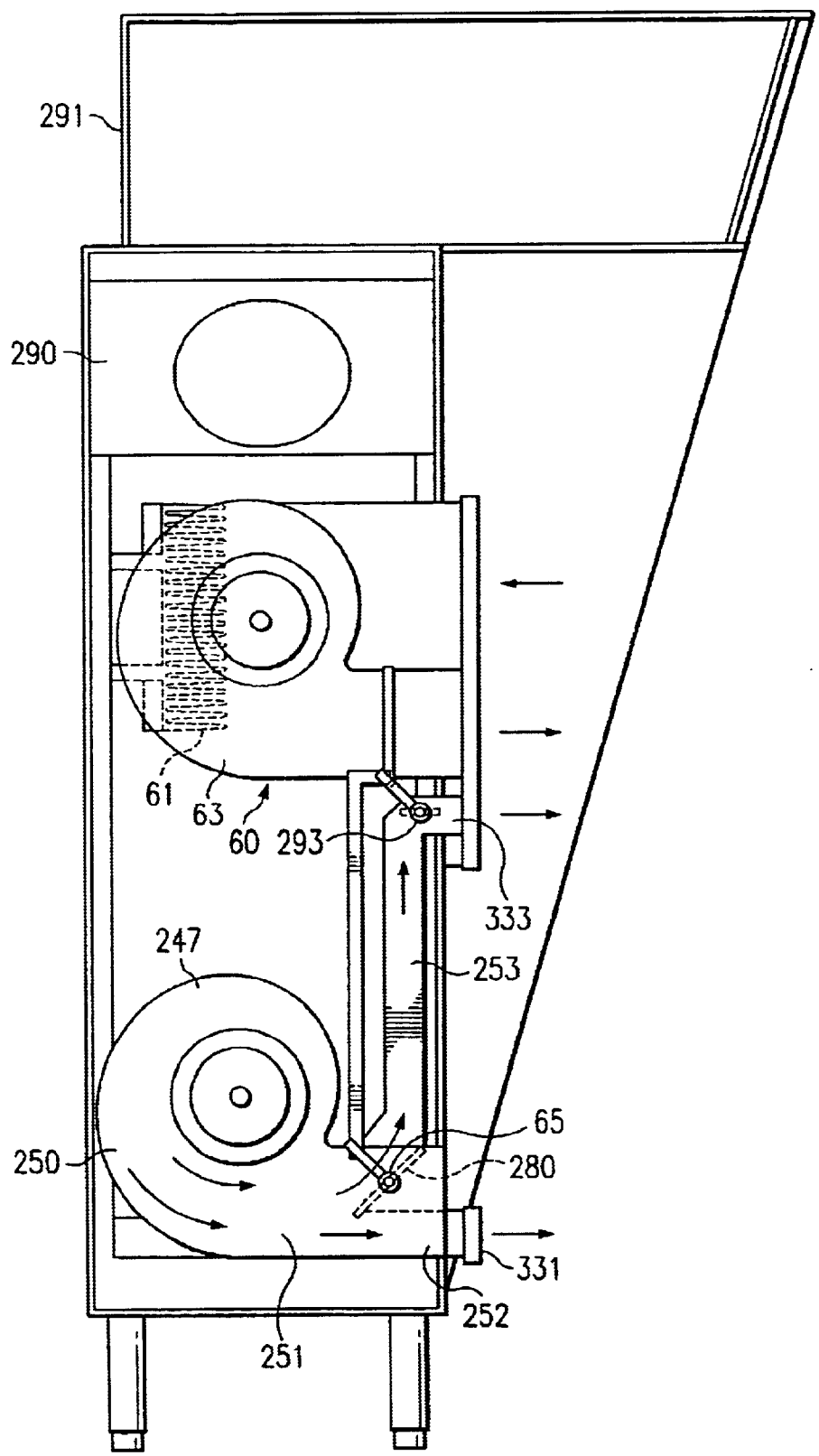
FIG. 5a is a cross-sectional view of the docking station according to the present invention when the refrigerated air diverter valve is positioned to supply refrigerated air to both the refrigeration chamber and rethermalization chamber of the delivery cart.
Figure 5B:
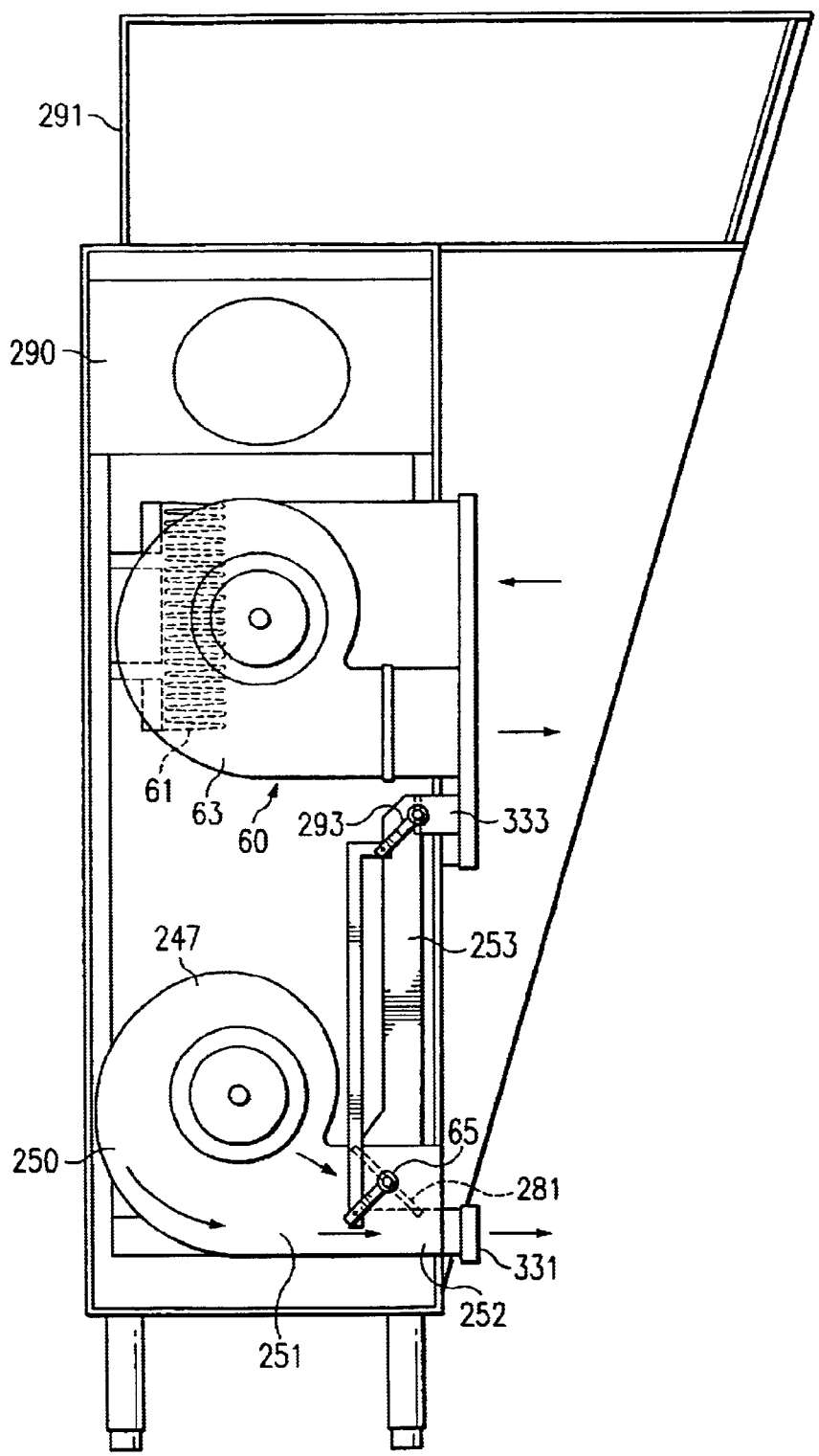
FIG. 5b is a cross-sectional view of the docking station according to the present invention when the refrigerated air diverted valve is positioned to supply refrigerated air only to the refrigeration chamber during rethermalization of the food contained within the rethermalization chamber of the delivery cart.

FIGS. 5a and 5b are cross sections of the docking unit as viewed from an opposite point from the viewpoint provided in FIG. 4. The docking unit has an area for an evaporator 290 and a separate area for a compressor and/or condenser 291. The refrigerated air source 250 is connected to a refrigerated air lead duct 251. The refrigerated air lead duct that has a baffle 65 that is capable of moving from a first position, 280 in FIG. 5a, during the first cycle to a second position, 281 in FIG. 5b, during the second cycle. In the first position, the refrigerated air lead duct supplies refrigerated air to a first refrigerated air supply duct 252 and a second refrigerated air supply duct 253. The first refrigerated air supply duct transfers refrigerated air to the first refrigerated air supply aperture 332. The second refrigerated air supply duct transfers refrigerated air to the second refrigerated air supply aperture 333. As illustrated in FIG. 5b, during the second or rethermalization cycle, the baffle is in the second position 281. When the baffle is in the second position refrigerated air is blocked from entering the second refrigeration supply duct 253. Thus, during the second or rethermalization cycle, all refrigerated air provided by the refrigerated air source is transferred via the first refrigeration supply duct 251 to the first refrigeration supply aperture 332. Proximate the second refrigerated air supply aperture 333, an air control valve 293 is provided. The purpose of the air control valve will be discussed further below. However, FIG. 5a illustrates the air control valve in an open or first position that allows refrigerated air flow from the second refrigerated air supply duct 253 through the second refrigerated air supply aperture 333. FIG. 5b illustrates the air control valve in a closed or second position that prevents refrigerated air flow from the second refrigerated air supply duct to or through the second refrigerated air supply aperture 333.

FIG. 6 shows the docking side of the delivery cart illustrated in FIG. 2 with the docking panel removed revealing an internal docking sidewall 358. The cross-sections of transverse refrigerated air supply duct 243 and transverse refrigerated air return duct 241 are shown. The cross-section of the transverse refrigerated air supply duct 243 corresponds to the location of the delivery cart first refrigerated air supply aperture on the docking panel. Likewise, the transverse refrigerated air return duct 241 corresponds to the location of the delivery cart first refrigerated air return aperture 321 on the docking panel. The cart heated air supply aperture 325 and the second cart refrigerated air supply aperture 323 provide air transfer from the docking unit into a vertical rethermalization section supply duct 356. It is important to emphasize that the vertical rethermalization section supply duct can be a conduit for either refrigerated air or heated air depending on whether the rethermalization system is in the first or second cycle. Rethermalization return ports 357 are provided and will be discussed further below.

FIG. 7 shows the delivery cart of FIG. 6 with both the docking panel and the vertical rethermalization section supply duct removed. Rethermalization supply ducts allow air transfer from the vertical rethermalization supply duct to the rethermalization section. Preferably, each rethermalization supply port has a lip (FIG. 4, ref. 249) that extends into the rethermalization section. When the rethermalization supply port has a lip, preferably, the lip is angled to direct air flow in the preferred direction within the rethermalization section.

FIG. 8 shows the delivery cart from the non-docking side with the non-docking side panel removed revealing and interior non-docking side wall 278. A vertical refrigerated air supply duct 255 extends from the transverse refrigerated air return duct along the extent of the non-mating side of the delivery cart. The interior non-docking side wall has refrigerated section air return ports 256 for each individual refrigerated section. Preferably, the refrigerated air return ports are rectangular. Preferably, when the delivery cart has two refrigerated sections, the vertical refrigerated air supply duct extends along the center of the non-mating side of the delivery cart and the refrigerated air return ports are positioned on both sides of the vertical refrigerated air supply duct as illustrated in FIG. 8. Preferably, the vertical refrigerated air supply duct is removable to clean the delivery cart.

FIG. 9 shows the delivery cart of FIG. 8 with the vertical refrigerated air supply duct removed. The cross-section of transverse refrigerated air supply duct 241 is now visible. Vertical axis 277 indicates the distinction between the two refrigerated sections of the preferred embodiment. At least one refrigerated section air supply port 257 is provided for each individual refrigerated section. More preferably, as demonstrated in FIG. 9, three refrigerated air supply ports are provided for each individual refrigerated section. Preferably, when three refrigerated air supply ports are provided, the refrigerated air supply ports are configured in a triangular arrangement as illustrated in FIG. 9. Since both the vertical rethermalization supply duct and the vertical refrigerated supply duct are preferably removable for more thorough cleaning of the delivery cart, it is preferred that the configuration or the shape of the refrigerated air supply ports is different than the configuration or shape of the rethermalization section supply ports. The visual distinction will assist the food service workers in reassembling the cart correctly after cleaning. However, since it is preferred that the supply ports, both for refrigerated section and for the rethermalization section of the cart, are circular, it is preferred that the visual distinction is accomplished by varying the number and/or configuration of the supply ports.

Referring to FIGS. 7 and 9, air return ports 357 and 256 are provided at each shelf level. This design allows the system to perform well even when the cart is not fully loaded with trays since each shelf level has air supply ports and return ports.

The rethermalization cart of the present invention has at least one rethermalization section and at least one refrigeration section. As stated above, it is more preferred that the delivery cart of the present invention has two rethermalization section and refrigeration sections. When the delivery cart has two rethermalization sections and refrigeration sections, the sections are arranged as depicted in FIG. 10.

Referring to FIG. 10, the preferred embodiment of the present invention has a first rethermalization section 213, a second rethermalization section 214, a first refrigeration section 215 and a second refrigeration section 216. The aforementioned sections, 213, 214, 215, 216, are provided in part by an interior thermal barrier 217 and an interior divider wall 218. As illustrated by FIG. 10, a mirror-image forms along the axis of the interior divider wall such that both rethermalization sections are located proximate the docking panel of the cart.

The air flow system of the rethermalization system of the present invention will be described below using the preferred embodiment as shown in FIG. 10 as the example.

The delivery cart is coupled or "docked" with a docking unit as seen in FIGS. 1 and 4. When the delivery cart is docked with the docking station, the delivery cart is oriented so that the rethermalization sections are proximate the docking unit and the refrigerated sections are distal to the docking unit. The docking unit apertures, 331, 332, 333, 334, 335, mate with the corresponding apertures in the delivery cart, 321, 322, 323, 324, 325, as discussed above.

When in the docked position, the rethermalization system has two cycles. In the first cycle, the docking unit provides refrigerated air to both the refrigerated section and rethermalization sections of the delivery cart. In the second cycle, the docking unit shifts refrigerated air previously supplied to the rethermalization section to the refrigerated section and provides heated air to the rethermalization section only. The manner by which the rethermalization system executes the first and second cycles and the manner by which the rethermalization system transfers from the first to the second cycle is discussed below.

During the first cycle, refrigerated air is transferred along the transverse refrigerated supply duct 255 to the vertical refrigerated supply duct 255. The refrigerated air then proceeds along the vertical refrigerated supply duct and is expelled into each individual refrigeration section 212 via the refrigerated air supply ports 257. Preferably, the refrigerated air supply ports have a lip 259 (nozzle) that extends into the refrigerated section. Once the refrigerated air is expelled into the refrigerated section, the following air current results. The refrigerated air flows across refrigerated section and encounters the thermal barrier 100. The refrigerated air moves along thermal barrier and is then drawn back toward internal non-docking side wall 278, and through the refrigerated section return ports 256. The general pattern of air-flow is illustrated as F in FIG. 10. The internal non-docking side wall 278, the external wall 279 of the vertical refrigerated supply duct 255, and the internal wall 291 of the non-docking side wall form a vertical refrigerated air return duct 290.

The vertical refrigerated return duct then transfers air to the transverse refrigerated return duct 243 (FIGS. 9 and 10) that extends across the bottom of the delivery cart. The transverse refrigerated return duct returns refrigerated air from the delivery cart to the docking unit via mated apertures 321 and 331. Aperture 331 in the docking unit leads to a first docking unit refrigerated air return duct that returns the refrigerated air to the refrigerated source. It is preferred that the returning refrigerated air is processed by a compressor/condenser and/or evaporator prior to being returned to the refrigeration source for reasons familiar to those in the art, and particularly to remove heat from the air that is being returned to the refrigeration source.

As will be clearly evident to those in the art, the first docking unit refrigerated air return duct is position so that the returned refrigerated air is now an air supply source for the refrigeration source having a blower/fan. As is known in the art, a blower/fan expels air from its face and concurrently creates a vacuum at its rear. Thus, with the present system, the refrigeration source has a blower or fan that both expels refrigerated air into the refrigerated air supply lead duct and draws in returned refrigerated air from the first docking unit return duct. Thus, the vacuum created assists in creating and maintaining the air flow pattern from the refrigeration source through the docking unit through the delivery cart back through docking unit and back to the refrigeration source.

Also in the first cycle, refrigerated air is supplied from the refrigeration source to the second refrigeration supply duct 253 because the baffle is in the first position 280. The refrigerated air is expelled through mated apertures 333 and 323 into the vertical rethermalization supply duct 356. The refrigerated air is expelled through the rethermalization section supply ports 257 into each individual rethermalization section 209. Each rethermalization section supply port preferably has a lip 259, which assists in directing air flow. The refrigerated air follows the same general pattern in the rethermalization section as in the refrigeration section and is illustrated in FIG. 10 as F. The refrigerated air exits each individual rethermalization section via the rethermalization return port 266 and empties into a vertical rethermalization return duct 283 created by the internal docking side wall 358, an external wall 284 of the rethermalization supply duct and an interior wall 285 of the docking panel 174. The return refrigerated air is then transferred from the delivery cart, via mated apertures 321 and 331, into to the first docking unit refrigerated return duct prior to the compressor/condenser and/or evaporator steps.

Thus, as described above, during the first or refrigeration cycle a closed refrigerated air flow system is created that provides refrigerated air flow to and through both the refrigerated and rethermalization sections of the delivery cart and back to and through the docking unit to the refrigeration source. A blower/fan provides an expelling force as well as a vacuum that creates and maintains the refrigerated air flow.

During the second or rethermalization cycle, refrigerated air transfer to the rethermalization section is neither required nor desired. At the beginning of the second or rethermalization cycle, the baffle is moved to the second position (FIG. 5b) where the baffle remains during the entire second cycle. In the second position, the baffle prevents refrigerated air flow into the second refrigeration supply duct, and, thus, prevents refrigerated air flow into the rethermalization section of the cart.

When the baffle is in the second position, all refrigerated air from refrigeration source is transferred via the first refrigeration supply duct to the refrigerated section in the manner discussed above.

As stated above, the docking unit has a heated air source 60 with heaters 61 and a blower/fan (FIG. 4, ref. 63). The heated air source provides heated air through a heated air lead duct and mated apertures 335 and 325 to the vertical rethermalization supply duct 356. Once in the rethermalization supply duct, the heated air follows the same air flow pattern into, through and out of the individual rethermalization sections as described above with respect to the refrigerated air and as depicted in FIG. 10 as F. Once the heated air has transferred from the individual rethermalization section into the vertical rethermalization section return port, the heated air is returned to the docking unit via mated apertures 326 and 336. Mated apertures 326 and 336 transfer the return heated air to a docking unit heated air supply duct. The heated air supply duct transfers the return heated air to the heated air source. As with the return of refrigerated air to the refrigerated source described above, the blower/fan in the heated air source provides both heated air expulsion toward the rethermalization section of the delivery cart and a vacuum action to draw the return heated air back to the heated source. Thus, a second closed heated air flow system is created and maintained during the second or rethermalization cycle.

Thus, when the rethermalization system is in the first cycle a closed air flow system is created that provides air flow from a refrigeration source in the docking unit through separate supply ducts through both the refrigerated section and the rethermalization section, through separate return ducts back through the refrigeration source to begin the air flow process again.

When the rethermalization system is in the second cycle, refrigerated air transfer to the rethermalization section is ceased and the rethermalization section of the cart is heated. As stated above, the baffle is capable of moving from a first position during the first cycle, to a second position during the second cycle. When the baffle is in the second cycle, refrigerated air is no longer transferred from the rethermalization lead duct to the second refrigerated supply duct. Thus, the entire outflow of the refrigeration source is transferred via the first refrigeration supply duct to the refrigeration section of the delivery cart.

Preferably, the docking unit has vents or valves that are capable of moving from a first, or open, valve position to a second, or closed, valve position. In the first position, air flow between the docking unit and the delivery cart is not impeded at the site of the valve. In the second position, air-flow between the docking unit and the delivery cart is stopped at the site of the valve. Preferably, the valves are located in the docking unit. More preferably, valves are located at apertures 331, 332, 333, 334, and 335 on the docking station for safety reasons to prevent objects from being inserted into the docking unit. Less preferably, valves may also be located elsewhere in the docking system, such as in the second refrigeration supply duct, the docking unit heated air supply duct, the docking unit heated air return duct and the second cold air return duct.

It is least preferable for the valves to be located in the delivery cart. If the valves are located in the delivery cart, electrical circuitry in the delivery cart would be required to produce the movement of the valve from the first position to the second position and back again to the first position when necessary. It is, thus, more preferable to have the valves in the docking unit, which is already supplied with electrical circuitry.

During the first or refrigeration cycle, valves preferably located at apertures 335 and 336 are in the closed position. During the first cycle, the entire cart is being refrigerated. The heat supply aperture 335 and the heat return apertures 336 are neither required nor desired during the first or refrigeration cycle. During the second or rethermalization cycle, valves preferably located at apertures 333 and 334 are in a closed position. As explained above, during the second or rethermalization cycle refrigerated air flow to the rethermalization section is discontinued by the location of the baffle 80 in the closed position. However, it is preferable to also have valves at apertures 333 and 334 to prevent refrigerated air flow from the docking unit to the rethermalization section. However, since apertures 331 and 332 still maintain refrigerated air flow through the refrigerated section, the valves at these aperture are usually in the open position.

Figure 11:
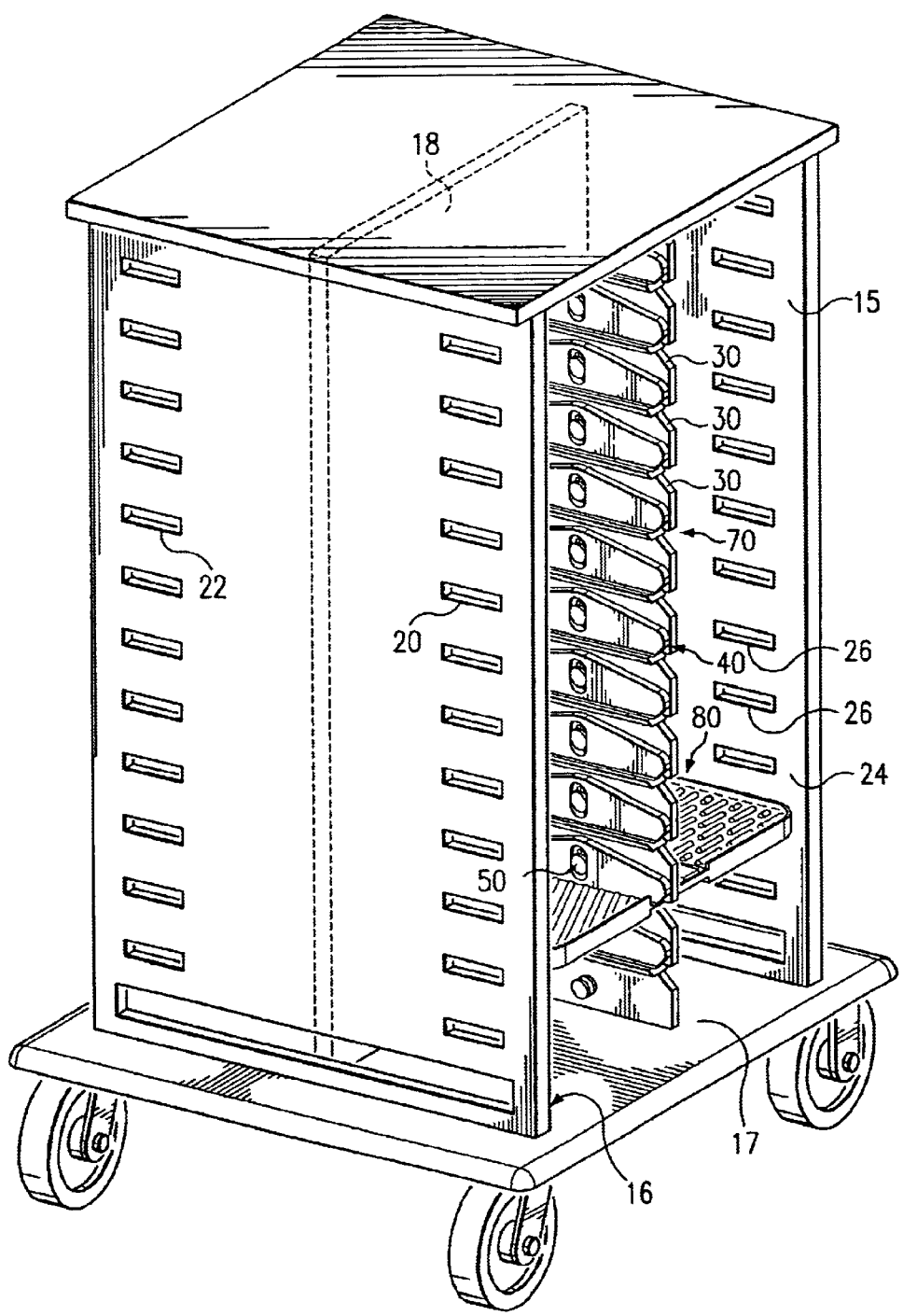
FIG. 11 is a perspective view of the interior of a delivery cart having thermal barriers disposed between the rethermalization and refrigeration chambers.

FIG. 11 illustrates a preferred embodiment of the thermal barrier system in use in a delivery cart. Although it is preferred that the thermal barrier system is incorporated into the preferred delivery cart as described above, the thermal barrier system may be incorporated into a delivery cart having conventional air flow systems. In FIG. 11 the delivery cart has interior side panels 15, 16, a floor panel 17, and interior top panel (not shown) that define the interior of the delivery cart. Preferably, there is an interpanel space (not shown) provided between any exterior side panel and its corresponding interior side panel. The exterior side panels that correspond to interior side panels 15 and 16 are preferably removable. These exterior side panels are removed to ease cleaning of the corresponding interpanel spaces.

Preferably each of the interior side panels 15, 16 has apertures that allow for airflow through the interior side walls into and out of the interior of the delivery cart.

Preferably, each interior side panel 15, 16 has apertures for air input 20 and apertures for air removal 22. Preferably, each of the apertures for air input 20 has a lip that extends into the interior as described above.

Figure 12:
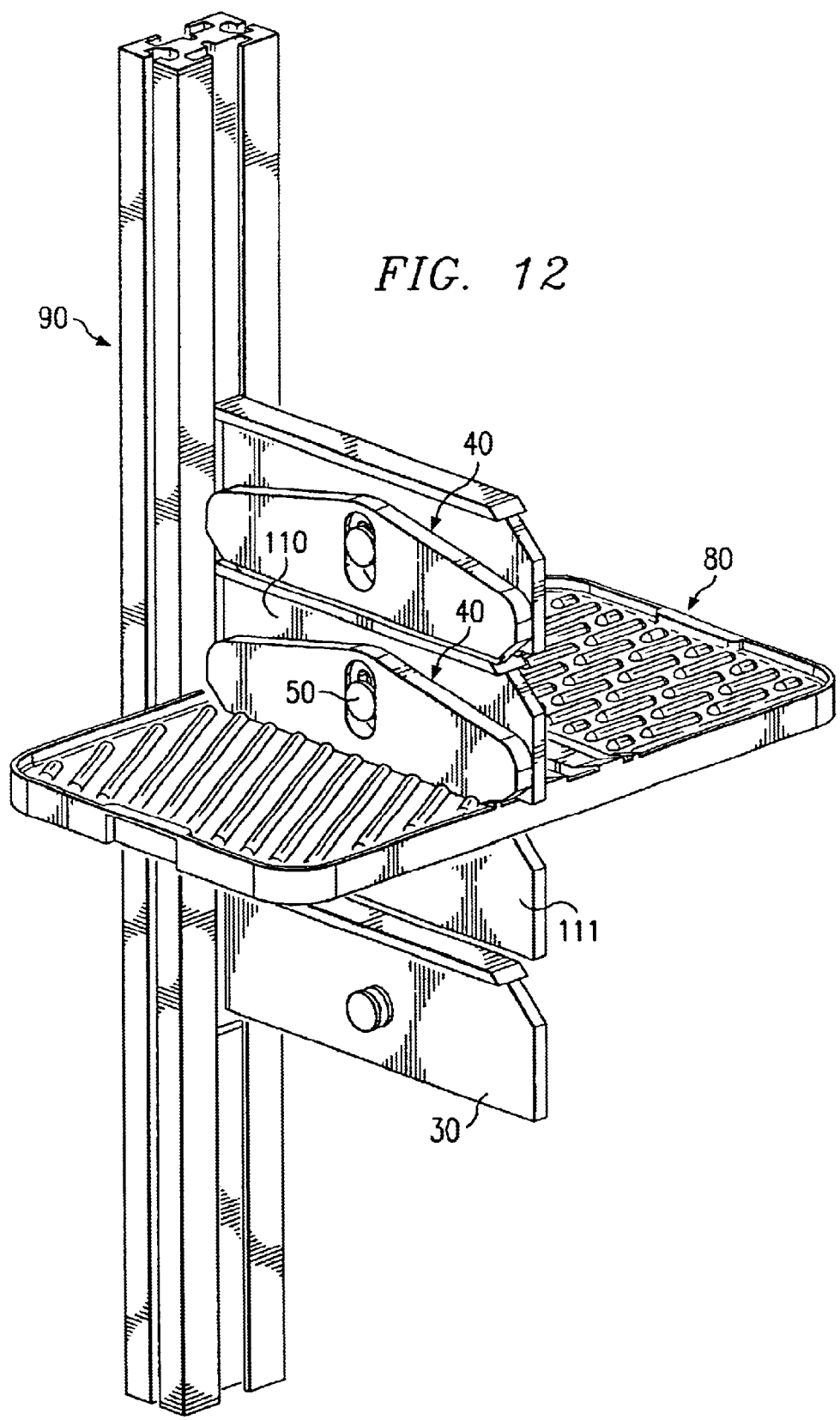
FIG. 12 is a broken-away left-side perspective view of the thermal barrier system of the present invention.

Still referring to FIG. 11, a plurality of dividers 30 is affixed to an interior panel 18. A second, more preferred embodiment, is illustrated in FIG. 12. In FIG. 12 the dividers 30 are affixed to a divider support beam 90, and the divider support beam 6 is then mounted on an interior panel. The dividers are mounted so that an interstice or tray space 70 forms between each divider. (The terms "interstice" and "tray space" are used interchangeably herein.) The interstice or tray space should be large enough to allow a tray 80 to be positioned between two dividers as illustrated in FIG. 12. Although dimensions of the dividers, the tray, and the tray space are interrelated, the dimensions of each of the aforementioned elements can be readily adjusted by those in the art by taking into consideration the following factors: the overall size of the delivery cart, the number of tray systems desired in the delivery cart, the size of the tray. In addition, the total number of thermal barrier systems in the delivery cart may be adjusted according to the needs of the institution.

The thermal barrier system of the delivery cart has an upper divider, a lower divider, and a floating seal to provide a thermal barrier. A tray may also be incorporated into the thermal barrier system without loss of the thermal barrier.

Figure 15:
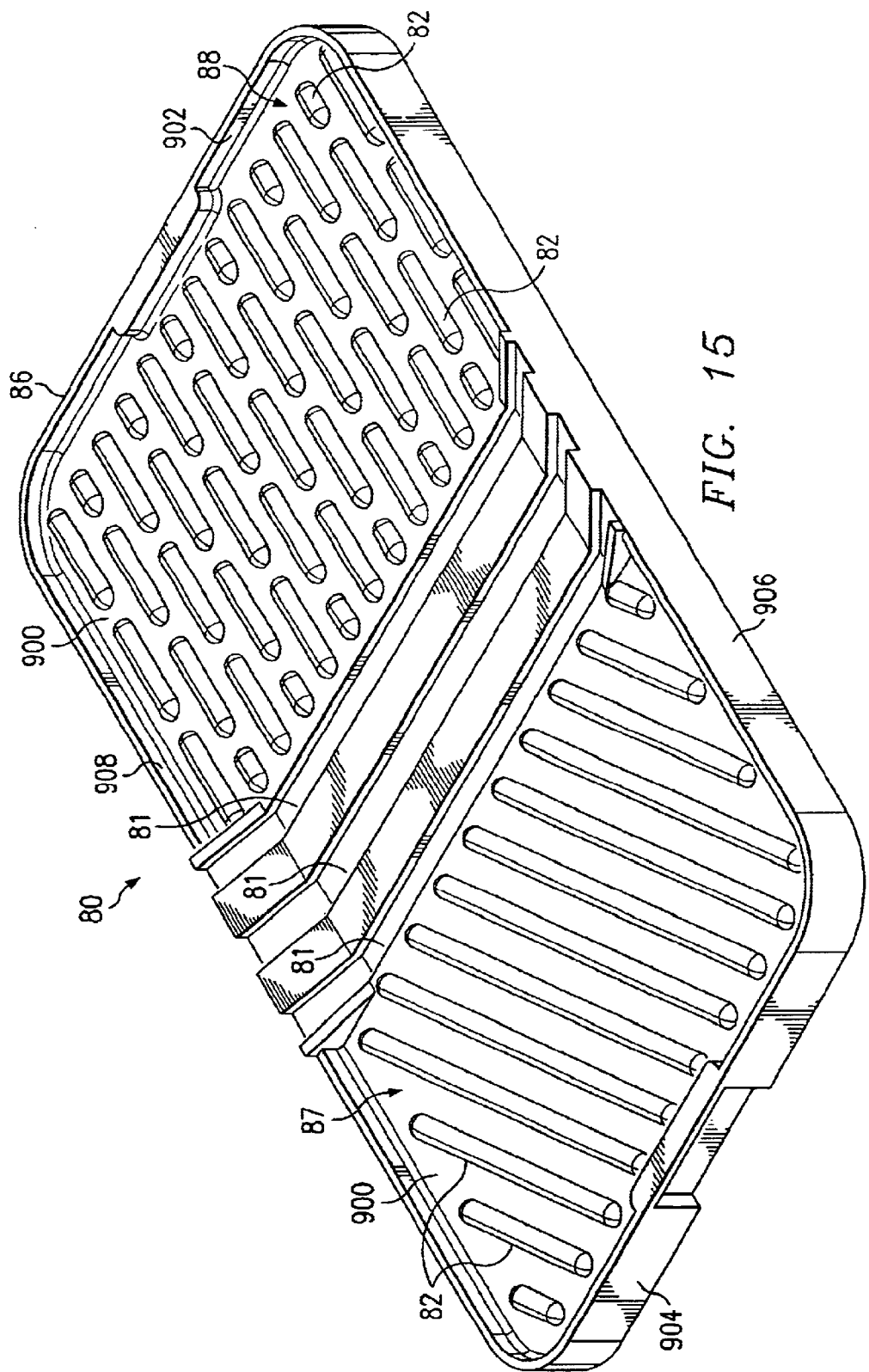
FIG. 15 is a perspective view of the cold and hot side dividing tray according to the present invention, providing various floating seal grooves.

FIG. 15 illustrates a preferred embodiment of the tray 80. The tray is preferably rectangular in shape. The tray may also have an upright wall 86 (comprising side walls 902, 904, 906 and 908) that defines the perimeter of the tray. The tray preferably has at least one tray groove 81. The tray groove assists in defining the rethermalization portion 86 from the refrigerated portion 87 of the tray. The cooperation of the tray groove with the floating seal will be discussed further below.

Preferably, the tray also has at least one raised protuberance 82 extending upwardly from the primary surface 900 of the tray on each of the refrigerated and rethermalization sections of the tray. More preferably, the tray has a plurality of protuberances allows for airflow beneath the dishware holding the food items stored in the delivery cart. By providing airflow beneath stored food items, stored food items are more effectively and efficiently refrigerated or rethermalized. The protuberances are preferably positioned on the upper surface of the tray at regular intervals. The protuberances may be elongated as illustrated in FIG. 15. However, most preferably, the protuberances 82 are arranged in pattern such that there are sufficient gaps between adjacent protuberances allowing air to flow between the protuberances through the gaps. The protuberances 82 can be described as discontinuous, meaning that no protuberance completely extends between opposing side walls, thereby permitting air flow in different directions beneath dishware holding the food items stored in the delivery cart For example, in a preferred embodiment of tray, the protuberances are diamond shaped.

As shown in FIG. 15, protuberances 82 do not extend above the height of the upright wall 86. Further, preferably, the top of each protuberance is at substantially the same height and is substantially flat. This allows dishware, especially drinking glasses, to be placed on the tray without toppling.

When the surface area dedicated to the rethermalized section of the tray is not equal to the surface area dedicated to the refrigerated section of the tray, it is preferred that the elongated protuberances on the refrigerated section of the tray are aligned in a pattern that differs from the pattern of elongated protuberances on the rethermalized section of the tray. For example, in FIG. 15, the elongated protuberances on the rethermalized portion of the tray are aligned in a parallel fashion with respect to the width of the tray. In contrast, the elongated protuberances on the refrigerated portion of the tray are aligned in a diagonal fashion with respect to the width of the tray. However, other patterns or indicators can be used to visually distinguish the rethermalization portion of the tray from the refrigerated portion of the tray. In a preferred example of such an visual indicating system, a snowflake design is used to indicate the refrigerated portion and a flame design is used to indicate the rethermalization portion of the tray. This manner of visually distinguishing the two portions of the tray assists the food service worker at two points in the food delivery process. First, the distinction assists the food service worker when food is placed on the tray. Second, the distinction assists the food service worker to properly align the tray for insertion into the cart.

The tray should be resistant to the effects of exposure to temperatures that vary from 35 degrees F. to 300 degrees F. Preferably, the tray is made from high heat thermoset material. The high heat thermoset material is selected with consideration of factors such as temperature resistance, stiffness, flame rating as well as other factors known to those in the art. Since the tray may have contact with food, the high heat thermoset material should be one approved by appropriate regulatory agency for such use. A preferred example of such a high heat thermoset material useful in the present invention is 1200-25 series SMC (Sheet molding compound) SL773 G-2 available from Premix, Inc.

Figure 13:
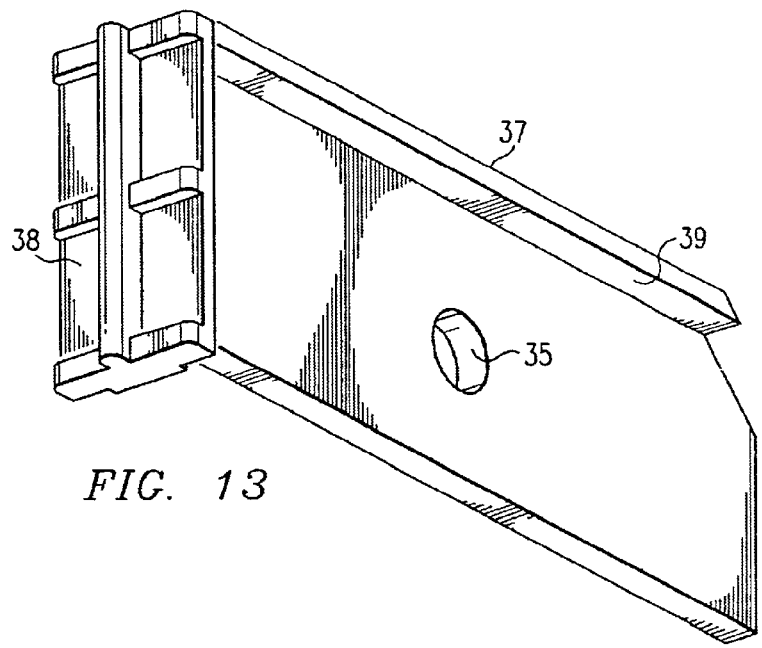
FIG. 13 is a perspective view of a the novel divider used in the thermal barrier system of FIG. 12

Referring to FIGS. 12 and 13 the divider has a pivot pin 50 having a head portion (not shown) and a spike-like portion (not shown). When the divider is formed from plastics, as preferred, it is difficult to mold the pivot pin directly into the divider. Accordingly, the divider is molded with a divider aperture 35. A pivot pin is then inserted into the aperture to extend perpendicularly from the divider. For reasons that will be discussed below, it is preferably that the pivot pin extends from the divider into the refrigerated section of the cart. It is also referable that after the pivot pin has been inserted into the divider aperture, the pivot pin is not removable from the divider.

Preferably, the divider has a flange 38. Preferably, the flange provides the point of attachment of the divider to the delivery cart, either directly or indirectly. The flange can be directly fastened to either the rear wall or an interior wall of the delivery cart. The flange may also be inserted into a divider support beam as illustrated in FIG. 12. The divider support beam is then fastened to either the rear wall or the interior wall of the delivery cart. Whether the divider is directly fastened to the delivery cart or is fastened to a divider support beam, it is important that the positioning of the divider is secure. Excessive movement of the dividers can compromise the efficacy of the thermal barrier.

The divider preferably has an upper support shelf 37. The upper support shelf cooperates with the floating seal, discussed below, to provide a thermal barrier when a tray is not inserted between two proximate dividers. When a tray is inserted between two proximate dividers the upper support shelf supports the tray and assists in maintaining the tray in a horizontal position.

The divider should be resistant to the effects of exposure to temperatures that vary from 35 degrees F. to 300 degrees F. Preferably, the divider is made from high heat thermoset material. The high heat thermoset material is selected with consideration of factors such as temperature resistance, stiffness, flame rating as well as other factors known to those in the art.

Since the divider may have contact with food, the high heat thermoset material should be one approved by appropriate regulatory agency for such use. A preferred example of such a high heat thermoset material useful in the present invention is 1200-25 series SMC (Sheet molding compound) SL-773 G-2 available from Premix, Inc.

Figure 14:
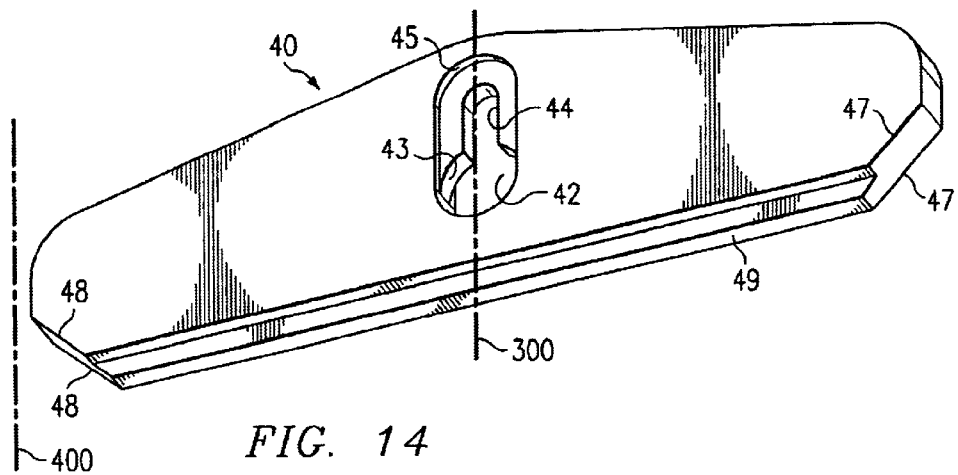
FIG. 14 is a perspective view of a preferred embodiment of the floating seal according to the present invention.

FIG. 14 illustrates a preferred embodiment of a floating seal 40 of the present invention. The floating seal has a central aperture 42 that cooperates with the pivot pin of the divider to provide vertical movement of the floating seal with respect to the divider. When the floating seal is detachable from the divider, the aperture has an elongated portion 44 and a circular portion 43 to form a keyhole shape. The circular portion accommodates the head portion of the pivot pin to allow the floating seal to slide on and off the pivot pin. It is most preferred that the floating seal is detachable from the divider for easier and more thorough cleaning.

The floating seal is preferably symmetrical in shape across the central axis 300 and the longitudinal axis 400. The symmetry about the central and longitudinal axes is especially important when the floating seal is detachable from the divider. A symmetrical seal allows the food service worker to quickly remount the floating seal without exerting special attention to the positioning of the floating seal.

It is preferred that the floating seal has two beveled edges 47, 48. The beveled edges provide an insertion point for the tray, and also aid in tray removal. When the tray has an upright wall that defines its perimeter as illustrated in FIG. 15, the two beveled edges to accommodate the upright wall to maintain the thermal barrier.

The floating seal is preferably formed from plastic since plastic is a poor conductor. The floating seal is preferably formed from high heat thermoplastics such as polyethersulfone (a nonlimiting example of which is Radel-A), polyetherimide (a non-limiting example of which is General Electric Ultem) and polysulfone (a non-limiting example of which is Udel). Most preferably, the floating seal is formed from General Electric Ultem. Most preferably, the floating seal is formed by injection molding. The floating seal preferably has a hollow volume defined within. The hollow volume may be filled with an insulating material such as fiberglass or insulating foam material. Alternatively, the floating seal may be a solid piece of plastic.

Because the floating seal is formed from plastic material, the floating seal should be positioned relative to the divider so that the majority of the floating seal is located in the refrigerated section of the delivery cart. Long term exposure to heat causes plastics to distort and to crack. By positioning the majority of the floating seal in the refrigerated portion of the cart, the life of the floating seal is extended. The portion of the floating seal that is exposed to the heated portion of the cart is preferably less than about, or about, ⅝ inch strip of the floating seal.

FIG. 12 illustrates a preferred embodiment of the present invention where the thermal barrier system is mounted on a divider support beam 90, which is then affixed to the interior of the delivery cart. In this preferred embodiment, the floating seal 40 is mounted on an upper divider 110. Preferably, the floating seal 40 is detachably mounted onto the divider. The floating seal is mounted as follows. The floating seal 40 has an aperture 42 having a circular portion 43 and an elongated portion 44. The pivot pin 50 extends perpendicularly from the divider. The floating seal 40 is reversibly attached to the divider 30 by placing the circular portion 43 of the aperture over the head of the pivot pin. The elongated portion of the aperture allows the floating seal to descend vertically as the floating seal slides along the shaft of the pivot pin toward the divider. The elongated portion of the aperture allows the floating seal to move up and down, i.e., "float", as compared to the fixed position of the divider.

Referring to FIG. 12, as the tray 3 is inserted between the floating seal 40 and a lower divider 111, the floating seal automatically moves upward in a vertical manner to accommodate the tray while still maintaining a thermal barrier. When the tray is removed, the floating seal automatically descends to contact the lower divider and, again, provide a thermal barrier. Thus, the floating seal cooperates with either the tray or the divider below to provide a thermal barrier. Because insertion of a tray into the interstice created between two adjacent dividers is not required to provide or maintain a thermal barrier, the tray system of the present invention allows flexibility in the vertical height and number of adjacent compartments.

Referring again to FIG. 14, in the most preferred embodiment of the tray system, an elliptical depression 45 surrounds the keyhole aperture of the floating seal. The elliptical depression 45 allows the pivot pin 50 to nest within the floating seal, and, thus, the head of the pivot pin 50 does not extend substantially above the refrigeration surface of the floating seal. As stated above, the elongated portion 44 of the floating seal aperture 42 allows the floating seal to "float" up and down relative to the position of the divider as a tray is inserted and removed from between the dividers.

Referring again to FIGS. 12, 14 and 15, the floating seal 40 preferably has two beveled edges 47, 48. The floating seal beveled edges both provide accommodation for trays having an upright wall and, provides for insertion and removal of the tray.

Figure 16:
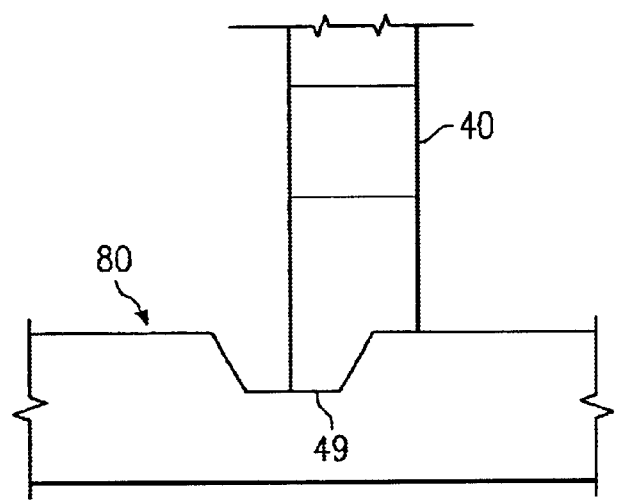
FIG. 16 is a partial cross-sectional view of floating seal of FIG. 14 cooperating with the groove shown in the tray of FIG. 15.

Referring to FIGS. 14 and 16, the lower edge 49 of the floating seal is preferably offset or corrugated. When the lower edge is offset the seal provided is more effective than seals provided by flat surface to flat surface contact. When the lower edge of the floating seal is offset, the tray has also grooves 81 and the upper edge 31 or tray shelf 33 of the divider is also depressions (not shown). As illustrated by FIG. 16, when the floating seal cooperates with either the tray or the divider below, the undulation of the floating seal will nest in the corresponding undulation of either the tray groove (as shown in FIG. 16) or the divider (not shown). The cooperation between the floating seal and tray or divider as illustrated in FIG. 16 provides for a more effective seal/thermal barrier than would be achieved by flat surface to flat surface contact.

When a divider support beam 90 is used, the divider has a flange 38. The flange is preferably inserted into a divider support beam as illustrated in FIG. 12 so that the flange is surrounded and held within the divider support beam. A top plan view of the preferred cooperation of the flange 38 with the divider support beam is illustrated in FIG. 10. Preferably, the flange of a plurality of dividers is inserted into the divider support beam. Within the divider support beam, each flange of the plurality of dividers abuts the flange of the adjacent divider. Although the flange slides along the extruded divider support, once in place the flange is firmly held by the extruded divider support. This firm placement of the divider provides better sealing features and better tray support.

The divider support beam may be formed by profile extrusion or pultrusion. When a profile extrusion process is used, the material used to form the divider support beam is selected according factors known in the art. Plastics are suitable materials for forming the divider support. It is preferable that the divider support beam is formed from extruded aluminum since it is relatively inexpensive and has a preferable strength to weight ratio. However, other materials suitable for forming the divider support beam are plastic profile extrusion or plastic pultrusion.

As discussed above, the shape of floating seal aperture provides for the "floating" upward/downward movement of the floating seal. Floating seal may be detached from the divider by reversing the manner in which the floating seal was affixed. The removal of the floating seal from the divider allows both the floating seal and the interior of the cart to be cleaned more efficiently and effectively. Since crevices form between the pivot pin, the floating seal and the dividers could not be cleaned as effectively if the floating seal could not be detached from the tray system. Because the delivery cart is used for delivering food items, the cleaning and sanitizing of the interior of the cart is especially important.

Figure 17:
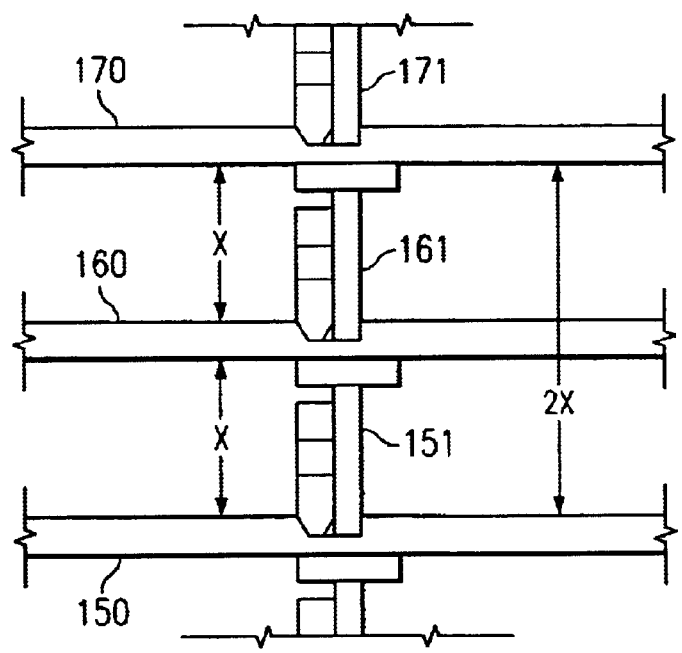
FIG. 17 provides a schematic illustration of how the novel thermal barrier system of the present invention provides adjacent refrigeration/rethermalization compartments that are adjustable in both vertical size and compartment number.

FIG. 17 is a schematic illustration of another advantage of the thermal barrier system of the present invention. Compartments of varying heights may be formed depending on the relative placement of two or more trays. Two adjacent pairs of compartments, each having a height X are formed by inserting trays 150, 160 and 170 between proximate dividers 151, 161 and 171. However, when tray 160 is removed the floating seal affixed to divider 161 depends to cooperate with divider 151 to provide a thermal barrier as well as two adjacent compartments having the height of 2X.

Referring again to FIG. 10 a top plan view of a preferred embodiment of the present invention illustrates a single delivery cart having two thermal barrier systems. Doors 150, which may be single or double, are in the closed position. Dividers 38 are affixed to the internal wall 600 via two divider support beams 90, and the dividers extend perpendicularly from the internal wall. Preferably, the dividers provide four quadrants 213, 214, 215 and 216. Both quadrants 213 and 214 are rethermalization sections, and both quadrants 215 and 216 are refrigerated sections. Essentially, in this preferred embodiment, two sets of thermal barrier provide two pairs of refrigeration and rethermalization compartments. As a result, each thermal barrier system is a mirror image of the other thermal barrier system along the axis 600.

The present invention is not limited to the examples illustrated above, as it is understood that one ordinarily skilled in the art would be able to utilize substitutes and equivalents without departing from the present invention.

What is claimed is:

1. A thermal treatment system comprising:
   a first thermal treatment section, said first thermal treatment section having a plurality of individual thermal treatment sections;
   a first air supply duct with at least one supply port associated with each said individual thermal treatment section through which temperature controlled air passes into each said individual thermal treatment section;
   at least one air return port for each said individual thermal treatment section through which said temperature controlled air exits the individual thermal treatment sections; and
   a barrier between each said individual thermal treatment section, said barrier comprising a removable tray, said removable tray having a plurality of protuberances on which a food product or container can rest and between which said temperature controlled air can pass.

2. The thermal treatment apparatus of claim 1 further comprising a heat source for heating said air.

3. A thermal treatment system comprising:
   a first thermal treatment section, said first thermal treatment section having a plurality of individual thermal treatment sections;
   a first air supply duct with at least one supply port associated with each said individual thermal treatment section through which temperature controlled air passes into each said individual thermal treatment section;
   at least one air return port for each said individual thermal treatment section through which said temperature controlled air exits the individual thermal treatment sections;
   a blower for circulating temperature controlled air into said first thermal treatment section; and
   wherein said first air supply duct has an upper end, a lower end and an inlet opening between said upper and lower ends in fluid communication with said blower, said first air supply duct having a plurality of air supply ports through which said air may exit said duct into said first thermal treatment section, said first air supply duct further comprising (a) a first tapered upper portion adjacent said inlet opening and a second tapered upper portion adjacent said upper end, said first tapered upper portion having a greater angle of taper than said second tapered upper portion, and (b) a first tapered lower portion adjacent said inlet opening and a second tapered lower portion adjacent said lower end, said first tapered lower portion having a greater angle of taper than said second tapered lower portion.

4. The thermal treatment apparatus of claim 3 further comprising a diverter adjacent said inlet opening of said first air supply duct for directing said air into said first air supply duct.

5. The thermal treatment apparatus of claim 4 wherein said diverter is adjustable to control the amount of air supplied to said upper and lower ends of said first air supply duct.

6. A thermal treatment system comprising:
   a first thermal treatment section, said first thermal treatment section having a plurality of individual thermal treatment sections;
   a first air supply duct with at least one supply port associated with each said individual thermal treatment section through which temperature controlled air passes into each said individual thermal treatment section;
   at least one air return port for each said individual thermal treatment section through which said temperature controlled air exits the individual thermal treatment sections;
   a blower for circulating temperature controlled air into said first thermal treatment section; and
   wherein said first air supply duct has an upper end, a lower end and an inlet opening adjacent said lower end, said first air supply duct having a first tapered portion adjacent said lower end and a second tapered portion adjacent said upper end; said first tapered portion having a greater angle of taper than said second tapered portion.

7. An air delivery system for a thermal treatment apparatus:
- a blower;
- at least one thermal treatment chamber; and
- a duct having an upper end, a lower end and an inlet opening between said upper and lower ends in fluid communication with said blower, said duct having a plurality of air supply ports through which said air may exit said duct into said chamber, said duct further comprising (a) a first tapered upper portion adjacent said inlet opening and a second tapered upper portion adjacent said upper end, said first tapered upper portion having a greater angle of taper than said second tapered upper portion, and (b) a first tapered lower portion adjacent said inlet opening and a second tapered lower portion adjacent said lower end, said first tapered lower portion having a greater angle of taper than said second tapered lower portion.

8. The system of claim 7 wherein said first tapered upper portion extends about ¼ to ½ of the distance between said inlet opening and said upper end of said duct.

9. The system of claim 7 wherein said first tapered upper portion tapers about 1 inch per 1 to 3 inches of length toward said upper end of said duct.

10. The system of claim 7 wherein said second tapered upper portion tapers about 1 inch per 7 to 16 inches of length toward said upper end of said duct.

11. The system of claim 7 wherein said first tapered lower portion extends about ¼ to ½ of the distance between said inlet opening and said lower end of said duct.

12. The system of claim 7 wherein said first tapered lower portion tapers about 1 inch per 1 to 3 inches of length toward said lower end of said duct.

13. The system of claim 7 wherein said second tapered lower portion tapers about 1 inch per 7 to 16 inches of length toward said lower end of said duct.

14. The thermal treatment apparatus of claim 7 further comprising a diverter adjacent said inlet opening of said first air supply duct for directing said air into said first air supply duct.

15. The thermal treatment apparatus of claim 14 wherein said diverter is adjustable to control the amount of air supplied to said upper and lower ends of said first air supply duct.

* * * * *

UNITED STATES PATENT AND TRADEMARK OFFICE
CERTIFICATE OF CORRECTION

PATENT NO. : 6,684,657 B1
DATED : February 3, 2004
INVENTOR(S) : Carl J. Dougherty It is certified that error appears in the above-identified patent and that said Letters Patent is hereby corrected as shown below:

Column 1,
Line 4, after "application", delete ".".

Column 2,
Line 4, delete "effecting", and insert -- affecting --.
Line 8, delete "place", and insert -- placed --.
Line 26, after the second occurrence of "with", insert -- a --.
Line 65, after "includes", delete ".", and insert -- : --.

Column 3,
Line 55, delete "include", and insert -- includes --.
Line 61, after "is", insert -- a --.

Column 4,
Line 50, after "12", insert -- ; --.

Column 5,
Line 3, delete "within", and insert -- herein --.

Column 6,
Line 49, after "shown", insert -- , --.

Column 7,
Line 35, after "tend", insert -- to --.

Column 8,
Line 65, delete "and", and insert -- an --.

Column 9,
Line 33, after "cart", delete ",".

Column 10,
Line 23, after "across", insert -- the --.
Line 47, delete "position", and insert -- positioned --.
Line 59, after "through", insert -- the --.

Column 11,
Line 11, after "into", delete "to".

UNITED STATES PATENT AND TRADEMARK OFFICE
CERTIFICATE OF CORRECTION

PATENT NO. : 6,684,657 B1
DATED : February 3, 2004
INVENTOR(S) : Carl J. Dougherty It is certified that error appears in the above-identified patent and that said Letters Patent is hereby corrected as shown below:

Column 12,
Line 49, delete "aperture", and insert -- apertures --.

Column 13,
Line 20, after "cart,", insert -- and --.
Line 42, delete "allows", and insert -- allowing --.
Line 57, after "cart", insert -- . --.

Column 14,
Line 12, delete "an", and insert -- a --.
Line 41, delete "preferably", and insert -- preferable --.
Line 43, delete "referable", and insert -- preferable --.

Column 15,
Line 34, after "edges", delete "to".
Line 39, delete "nonlimiting", and insert -- non-limiting --.

Column 17,
Line 4, after "according", insert -- to --.

Signed and Sealed this

Twentieth Day of July, 2004

JON W. DUDAS
*Acting Director of the United States Patent and Trademark Office*